(12) United States Patent
Weinstein et al.

(10) Patent No.: US 7,983,239 B1
(45) Date of Patent: Jul. 19, 2011

(54) SYSTEMS AND METHODS FOR CONSTRUCTING A VIRTUAL MODEL OF A MULTI-HOP, MULTI-ACCESS NETWORK

(75) Inventors: Joseph J. Weinstein, Somerville, MA (US); Vladimir Rosenzweig, Belmont, MA (US); Isidro Marcos Castineyra, Somerville, MA (US); Jonathan Shapiro, Framingham, MA (US)

(73) Assignee: Raytheon BBN Technologies Corp., Cambridge, MA (US)

( * ) Notice: Subject to any disclaimer, the term of this patent is extended or adjusted under 35 U.S.C. 154(b) by 1437 days.

(21) Appl. No.: 10/752,988

(22) Filed: Jan. 7, 2004

Related U.S. Application Data

(60) Provisional application No. 60/438,459, filed on Jan. 7, 2003, provisional application No. 60/475,177, filed on Jun. 2, 2003, provisional application No. 60/493,660, filed on Aug. 8, 2003.

(51) Int. Cl.
*G01R 31/08* (2006.01)
*H04L 12/28* (2006.01)
(52) U.S. Cl. .......... 370/351; 370/238; 370/397
(58) Field of Classification Search .......... 370/235, 370/236, 351, 389, 400, 238, 390, 419, 255, 370/352
See application file for complete search history.

(56) References Cited

U.S. PATENT DOCUMENTS

| | | | |
|---|---|---|---|
| 4,718,002 A | 1/1988 | Carr | |
| 4,827,411 A | 5/1989 | Arrowood et al. | |
| 5,079,767 A * | 1/1992 | Perlman | 370/408 |
| 5,093,824 A | 3/1992 | Coan et al. | |
| 5,117,422 A | 5/1992 | Hauptschein et al. | |
| 5,175,843 A | 12/1992 | Casavant et al. | |
| 5,243,592 A | 9/1993 | Perlman et al. | |
| 5,412,654 A | 5/1995 | Perkins | |
| 5,430,729 A | 7/1995 | Rahnema | |
| 5,541,912 A | 7/1996 | Choudhury et al. | |
| 5,649,119 A | 7/1997 | Kondoh et al. | |
| 5,742,820 A | 4/1998 | Perlman et al. | |
| 5,764,895 A | 6/1998 | Chung | |
| 5,828,835 A | 10/1998 | Isfeld et al. | |

(Continued)

FOREIGN PATENT DOCUMENTS
EP 0447725 A 9/1991
(Continued)

OTHER PUBLICATIONS
Office Action dated Feb. 25, 2009, U.S. Appl. No. 10/649,030.
(Continued)

*Primary Examiner* — Hanh Nguyen
(74) *Attorney, Agent, or Firm* — Ropes & Gray LLP

(57) ABSTRACT

A system constructs an OSPF-compatible virtual model of a multi-hop, multi-access packet radio network that includes a plurality of routers (120) and which includes its own private, internal routing system (150), in order to facilitate the incorporation of that packet radio network into an overall OSPF routing environment. The system determines a network graph identifying actual connectivity among the plurality of routers (120). The system constructs a virtual model (300) of the, wherein connectivity of the virtual model may be different than the actual connectivity of the network graph. The system represents the multi-hop, multi-access radio network in the virtual model as a set of multi-access links (305, 310), point-to-point links, AS-external routes, and area summary routes. The system employs the virtual model for routing purposes and advertises the virtual model to other OSPF routers for the same purpose.

37 Claims, 16 Drawing Sheets

U.S. PATENT DOCUMENTS

| | | |
|---|---|---|
| 5,850,592 A | 12/1998 | Ramanathan |
| 5,878,056 A | 3/1999 | Black et al. |
| 5,878,095 A | 3/1999 | Kainulainen |
| 5,881,246 A | 3/1999 | Crawley et al. |
| 5,884,040 A | 3/1999 | Chung |
| 5,903,735 A | 5/1999 | Kidder et al. |
| 5,913,921 A | 6/1999 | Tosey et al. |
| 5,959,989 A | 9/1999 | Gleeson et al. |
| 5,960,047 A | 9/1999 | Proctor, Jr. et al. |
| 5,974,327 A | 10/1999 | Agrawal et al. |
| 6,000,011 A | 12/1999 | Freerksen et al. |
| 6,028,857 A | 2/2000 | Poor |
| 6,032,190 A | 2/2000 | Bremer et al. |
| 6,046,978 A | 4/2000 | Melnik |
| 6,067,301 A | 5/2000 | Aatresh |
| 6,069,895 A | 5/2000 | Ayandeh |
| 6,088,622 A | 7/2000 | Dollin et al. |
| 6,088,734 A | 7/2000 | Marin et al. |
| 6,092,096 A | 7/2000 | Lewis |
| 6,094,435 A | 7/2000 | Hoffman et al. |
| 6,122,753 A | 9/2000 | Masuo et al. |
| 6,139,199 A | 10/2000 | Rodriguez |
| 6,151,308 A | 11/2000 | Ibanez-Meier et al. |
| 6,173,324 B1 | 1/2001 | D'Souza |
| 6,215,765 B1 | 4/2001 | McAllister et al. |
| 6,216,167 B1 | 4/2001 | Momirov |
| 6,252,856 B1 * | 6/2001 | Zhang ............................ 370/254 |
| 6,262,976 B1 | 7/2001 | McNamara |
| 6,272,567 B1 | 8/2001 | Pal et al. |
| 6,275,492 B1 * | 8/2001 | Zhang ............................ 370/392 |
| 6,304,548 B1 * | 10/2001 | Shaffer et al. ................. 370/229 |
| 6,304,556 B1 | 10/2001 | Haas |
| 6,310,883 B1 | 10/2001 | Mann et al. |
| 6,330,459 B1 | 12/2001 | Crichton et al. |
| 6,349,091 B1 | 2/2002 | Li |
| 6,362,821 B1 | 3/2002 | Gibson et al. |
| 6,385,174 B1 | 5/2002 | Li |
| 6,385,673 B1 | 5/2002 | DeMoney |
| 6,385,714 B1 | 5/2002 | Koumura et al. ............. 712/219 |
| 6,396,814 B1 | 5/2002 | Iwamura et al. |
| 6,418,299 B1 | 7/2002 | Ramanathan |
| 6,456,599 B1 | 9/2002 | Elliott |
| 6,470,329 B1 | 10/2002 | Livschitz |
| 6,473,421 B1 | 10/2002 | Tappan |
| 6,473,434 B1 | 10/2002 | Araya et al. |
| 6,496,510 B1 | 12/2002 | Tsukakoshi et al. |
| 6,542,469 B1 | 4/2003 | Kelley et al. |
| 6,570,867 B1 | 5/2003 | Robinson et al. |
| 6,574,227 B1 * | 6/2003 | Rosenberg et al. ...... 370/395.65 |
| 6,594,268 B1 | 7/2003 | Aukia et al. |
| 6,611,522 B1 | 8/2003 | Zheng et al. |
| 6,628,929 B1 | 9/2003 | Nomura et al. |
| 6,631,136 B1 | 10/2003 | Chowdhury et al. |
| 6,633,544 B1 | 10/2003 | Rexford et al. |
| 6,671,819 B1 * | 12/2003 | Passman et al. .................... 714/4 |
| 6,683,885 B1 | 1/2004 | Sugai et al. |
| 6,687,781 B2 | 2/2004 | Wynne et al. |
| 6,714,563 B1 | 3/2004 | Kushi |
| 6,721,273 B1 | 4/2004 | Lyon |
| 6,745,224 B1 | 6/2004 | D'Souza et al. |
| 6,769,043 B1 | 7/2004 | Fedorkow et al. |
| 6,804,236 B1 | 10/2004 | Mahajan et al. |
| 6,807,158 B2 | 10/2004 | Krishnamurthy et al. |
| 6,807,172 B1 | 10/2004 | Levenson et al. |
| 6,829,222 B2 | 12/2004 | Amis et al. |
| 6,870,846 B2 | 3/2005 | Cain |
| 6,954,449 B2 | 10/2005 | Cain et al. |
| RE38,902 E | 11/2005 | Srisuresh et al. |
| 6,977,895 B1 | 12/2005 | Shi et al. |
| 6,977,937 B1 | 12/2005 | Weinstein et al. |
| 6,980,515 B1 | 12/2005 | Schunk et al. |
| 6,980,537 B1 * | 12/2005 | Liu ............................... 370/338 |
| 6,990,350 B2 | 1/2006 | Davis et al. |
| 7,020,501 B1 | 3/2006 | Elliott et al. |
| 7,020,701 B1 | 3/2006 | Gelvin et al. |
| 7,039,720 B2 * | 5/2006 | Alfieri et al. ................. 709/242 |
| 7,042,834 B1 | 5/2006 | Savage |
| 7,042,837 B1 | 5/2006 | Cassiday et al. |
| 7,046,628 B2 | 5/2006 | Luhmann et al. |
| 7,065,059 B1 | 6/2006 | Zinin |
| 7,068,971 B2 | 6/2006 | Abutaleb et al. |
| 7,072,952 B2 | 7/2006 | Takehiro et al. |
| 7,103,344 B2 | 9/2006 | Menard |
| 7,106,703 B1 | 9/2006 | Belcea |
| 7,120,120 B2 * | 10/2006 | Guerin et al. .................. 370/238 |
| 7,177,295 B1 | 2/2007 | Sholander et al. |
| 7,184,421 B1 | 2/2007 | Liu et al. |
| 7,200,120 B1 * | 4/2007 | Greenberg et al. ........... 370/254 |
| 7,215,926 B2 | 5/2007 | Corbett et al. |
| 7,254,111 B2 * | 8/2007 | Choe et al. ..................... 370/219 |
| 7,266,386 B2 | 9/2007 | Kim et al. |
| 7,281,057 B2 | 10/2007 | Cain |
| 7,289,456 B2 * | 10/2007 | Gupta et al. ................... 370/254 |
| 7,353,259 B1 | 4/2008 | Bakke et al. |
| 7,369,512 B1 | 5/2008 | Shurbanov et al. |
| 2001/0007560 A1 | 7/2001 | Masuda et al. |
| 2001/0034793 A1 | 10/2001 | Madruga et al. |
| 2001/0040895 A1 | 11/2001 | Templin |
| 2001/0045914 A1 | 11/2001 | Bunker |
| 2002/0016869 A1 | 2/2002 | Comeau et al. |
| 2002/0029214 A1 | 3/2002 | Yianilos et al. |
| 2002/0057660 A1 | 5/2002 | Park et al. |
| 2002/0067693 A1 | 6/2002 | Kodialam et al. |
| 2002/0071392 A1 | 6/2002 | Grover et al. |
| 2002/0075813 A1 | 6/2002 | Baldonado et al. |
| 2002/0080755 A1 | 6/2002 | Tasman et al. |
| 2002/0103893 A1 | 8/2002 | Frelechoux et al. |
| 2002/0108107 A1 | 8/2002 | Darnell et al. |
| 2002/0131409 A1 | 9/2002 | Frank et al. |
| 2002/0143755 A1 | 10/2002 | Wynblatt et al. |
| 2002/0176390 A1 | 11/2002 | Sparr et al. |
| 2002/0186694 A1 | 12/2002 | Mahajan et al. |
| 2002/0191545 A1 | 12/2002 | Pieda et al. |
| 2003/0012168 A1 | 1/2003 | Elson et al. |
| 2003/0016624 A1 | 1/2003 | Bare |
| 2003/0043742 A1 | 3/2003 | De Maria et al. |
| 2003/0048771 A1 | 3/2003 | Shipman |
| 2003/0058852 A1 | 3/2003 | Luhmann et al. |
| 2003/0063613 A1 | 4/2003 | Carpini et al. |
| 2003/0093576 A1 | 5/2003 | Dettinger et al. |
| 2003/0096577 A1 | 5/2003 | Heinonen et al. |
| 2003/0124976 A1 | 7/2003 | Tamaki et al. |
| 2003/0126284 A1 | 7/2003 | Houston et al. |
| 2003/0152182 A1 | 8/2003 | Pai et al. |
| 2003/0153338 A1 | 8/2003 | Herz et al. |
| 2003/0174654 A1 | 9/2003 | Tateson et al. |
| 2003/0174719 A1 | 9/2003 | Sampath et al. |
| 2003/0179751 A1 | 9/2003 | Omae et al. |
| 2003/0202476 A1 | 10/2003 | Billhartz et al. |
| 2004/0001720 A1 | 1/2004 | Krill et al. |
| 2004/0003111 A1 | 1/2004 | Maeda et al. |
| 2004/0027284 A1 | 2/2004 | Leeper et al. |
| 2004/0029553 A1 | 2/2004 | Cain |
| 2004/0032856 A1 | 2/2004 | Sandstrom |
| 2004/0106408 A1 | 6/2004 | Beasley et al. |
| 2004/0131079 A1 | 7/2004 | Hegde et al. |
| 2004/0202164 A1 | 10/2004 | Hooper et al. |
| 2004/0213167 A1 | 10/2004 | Garcia-Luna-Aceves et al. |
| 2004/0243702 A1 | 12/2004 | Vainio et al. |
| 2005/0013613 A1 | 1/2005 | Stevenson et al. |
| 2005/0030949 A1 | 2/2005 | Shirakawa et al. |
| 2005/0036442 A1 | 2/2005 | Saleh et al. |
| 2005/0050221 A1 | 3/2005 | Tasman et al. |
| 2005/0117914 A1 | 6/2005 | Chuah et al. |
| 2005/0213586 A1 | 9/2005 | Cyganski et al. |
| 2007/0106852 A1 | 5/2007 | Lam et al. |

FOREIGN PATENT DOCUMENTS

| | | | |
|---|---|---|---|
| WO | WO 01/37483 A | 5/2001 | |

OTHER PUBLICATIONS

Office Action dated Jan. 22, 2009, U.S. Appl. No. 10/694,968.
Office Action dated May 1, 2009, U.S. Appl. No. 10/913,151.
Office Action dated Apr. 18, 2008, U.S. Appl. No. 11/088,045.
Office Action dated Jun. 11, 2008, U.S. Appl. No. 10/786,335.
Office Action dated Jun. 26, 2008, U.S. Appl. No. 10/913,151.

Lin, et al., "Adaptive Clusterin for Mobile Wireless Networks," IEEE Journal on Selected Areas in communications, 15(7):1-21 (1997).
CMSC 451, Dave Mount. CMSC 451: Lecture 11. "Articulation Points and Biconnected Components," Tuesday, Oct. 6, 1998. www.cs.umd.edu/~samir/451/bc.ps. pp. 1-5.
Khuller, et al., "Biconnectivity Approximations and Graph Carvings," Journal of the ACM, 41(2):214-235 (1994).
Liao, et al., "Grid: A Fully Location-Aware Routing Protocol for Mobile Ad Hoc Networks," Telecommunications Systems, 18(1):37-60 (2001).
Garg, et al, "Improved Approximation Algorithms for Biconnected Subgraphs via Better Lower Bounding Techniques," Department of Computer Science and Engineering, Indian Institute of Technology, New Delhi, pp. 103-111 (1993).
Li, et al., "Sending Messages to Mobile Users in Disconnected Ad-Hoc Wireless Networks," MOBICOM (2000).
McAuley, et al., "Self-Configuring Networks," MOBICOM pp. 315-319 (2000).
Jennings, et al., "Topology Control for Efficient Information Dissemination in Ad-hoc Networks," Jet Propulsion Laboratory, pp. 1-7.(2002).
Hsu, et al., "Simpler and Faster Biconnectivity Augmentation," Journal of Algorithms, 45:55-71 (2002).
Office Action dated Nov. 2, 2007, U.S. Appl. No. 10/786,335.
Office Action dated Nov. 16, 2007, U.S. Appl. No. 10/649,030.
Office Action dated Dec. 13, 2007, U.S. Appl. No. 10/328,566.
Office Action dated Oct. 27, 2009, U.S. Appl. No. 10/786,335.
Office Action dated Nov. 24, 2009, U.S. Appl. No. 10/913,151.
Office Action dated Oct. 28, 2010, U.S. Appl. No. 12/576,170.
Notice of Allowance issued Oct. 5, 2010 in U.S. Appl. No. 10/913,151.
Winfield, Alan, "Distributed Sensing and Data Collection Via Broken Ad Hoc Wireless Connected Networks of Mobile Robots," Springer, pp. 273-282, (2000).
Waligore, "Test and Training Technology Workshop" Applied Research Laboratories, Feb. 15, 2002, 27 pages.
SEA (Group) Ltd., "Terra SAR Equipment Development", 2003 1 page.
Ramanathan et al., "Topology Control of Multihop Wireless Networks using Transmit Power Adjustment," Proc. IEEE Infocom 2000, Mar. 2000, 10 pages.
Prague, "Power Line Carrier Techniques Applied to Spacecraft Data Handling, Data Systems in Areospace DASIA", Jun. 2-6, 2003, Czech Republic, 16 pages.
Pascall et al., "Commercial Satellite Communication", 1997 pp. 78-91.
Office Action dated Oct. 3, 2007, U.S. Appl. No. 10/702,308.
Office Action dated Oct. 11, 2005, U.S. Appl. No. 10/649,030.
Office Action dated Oct. 10, 2006, U.S. Appl. No. 10/649,030.
Office Action dated May 17, 2007, U.S. Appl. No. 10/649,030.
Office Action dated May 16, 2007, U.S. Appl. No. 10/702,308.
Office Action dated Feb. 24, 2009, U.S. Appl. No. 10/786,335.
McKeown, "A Quick Tutorial on IP Router Design", Optics and Routing Seminar, Oct. 10, 2000.
Everett, "GPM Reference Interfaces", May 30, 2001, 9 pages.
Choudhury et al., "Using Directional Antennas for Medium Access Control in Ad Hoc Networks", MOBICOM' 002, Sep. 23-28, 2002, pp. 59-70.
Bevan et al., "Free-Space Optical Data Bus for Spacecraft", Earth Science Technology Conference, Jun. 24-26, 2003, 6 pages.
Basu et al., "Movement Control Algorithms for Realization of Fault-Tolerant Ad Hoc Robot Networks," IEEE Network, pp. 36-44, Jul./Aug. 2004.
U.S. Appl. No. 10/752,988, filed Jan. 7, 2004; Joseph Jacob Weinstein et al.; Systems and Methods for Constructing a Virtual Model of a Multi-Hop, Multi-Access Network; 81 pages.
"Packet Radio Routing," Gregory S. Lauer, Ch. 11, "Routing in Communications Networks," ed. Martha Steenstrup, Prentice Hall, pp. 352-396 (1995).
"The Organization of Computer Resources into a Packet Radio Network," R.E. Kahn, IEEE Trans. on Communications. COM-25:1, 169-78 (Jan. 1977).
"The DARPA Packet Radio Network Protocols," J. Jubin et al., Proc. of the IEEE, 75:1, 21-32 (Jan. 1987).
"Analysis of Routing Strategies for Packet Radio Networks," J.J. Garcia Lune Aceves et al., Proc. of the IEEE INFOCOM '85, Washington, DC, 292-302 (185).
"Packet Radio Network Routing Algorithms: A Survey," J.J. Hahn et al., IEEE Communications Magazine. 22:11, 41-7 (Nov. 1984).
"Link-State Routing," John Moy, Ch. 5, "Routing in Communications Networks," ed. Martha Steenstrup, Prentice Hall, pp. 136-157 (1995).
U.S. Appl. No. 10/797,030, filed Mar. 11, 2004; Joseph Jacob Weinstein et al.; Systems and Methods for Synchronizing Multiple Copies of a Database Using Database Digest; 49 pages.
U.S. Appl. No. 09/546,052, filed Apr. 10, 2000; Joseph Jacob Weinstein et al.; Radio Network Routing Apparatus; 31 pages.
Co-pending U.S. Appl. No. 10/453,166, filed Jun. 3, 2003, entitled: "Database Exchange Suppression for Stub Routers in a Communications Network."
Co-pending U.S. Appl. No. 09/546,052, filed Apr. 10, 2000, entitled: "Radio Network Routing Apparatus."

* cited by examiner

SYSTEMS AND METHODS FOR CONSTRUCTING A VIRTUAL MODEL OF A MULTI-HOP, MULTI-ACCESS NETWORK

CROSS REFERENCE TO RELATED APPLICATIONS

The instant application claims the benefit of provisional application No. 60/438,459, filed Jan. 7, 2003; provisional application No. 60/475,177, filed Jun. 2, 2003; and provisional application No. 60/493,660, filed Aug. 8, 2003; the disclosures of which are hereby incorporated herein by reference in their respective entireties.

GOVERNMENT CONTRACT

The U.S. Government has a paid-up license in this invention and the right in limited circumstances to require the patent owner to license others on reasonable terms as provided for by the terms of Contract No. DAAB07-02-C-C403 awarded by the United States Army.

RELATED APPLICATION

The present application is related to commonly assigned U.S. patent application Ser. No. 09/546,052, entitled "Radio Network Routing Apparatus," and filed Apr. 10, 2000, the disclosure of which is hereby incorporated herein by reference in its entirety.

FIELD OF THE INVENTION

The present invention relates generally to digital communications networks and, more particularly, to systems and methods for seamlessly integrating a multi-hop, multi-access packet radio network with its own private routing system (a MANET, or Mobile Ad-hoc NETwork) into an overall Open Shortest Path First (OSPF) routing environment by constructing a virtual model of the packet radio network to be used by OSPF for routing purposes.

BACKGROUND OF THE INVENTION

Conventional wired communications networks, such as, for example, the Internet, use various algorithms for disseminating routing data necessary for routing packets from a source node to a destination node. Each node of the network that handles packets has sufficient knowledge of the network topology such that it can choose the right output interface through which to forward received packets. Link state routing algorithms, such as the OSPF algorithm, permit the construction of a network topology such that any given node in the network may make packet-forwarding decisions. OSPF is defined by Internet RFC 2328, STD 54, and related documents, published by the Internet Society. OSPF is also defined by Internet RFC 2740, and related documents, also published by the Internet Society.

OSPF has conventionally been implemented in wired point-to-point or multi-access (Ethernet like) networks. It may also be highly desirable to implement OSPF over a multi-hop, multi-access packet radio network with its own private, internal routing system, so as to permit seamless integration of such a network into an OSPF environment, and to achieve strict compatibility between that packet radio network and standard COTS (Commercial Off-The-Shelf) routers outside that network. This can be achieved either by implementing OSPF at a higher layer over the multi-hop, multi-access packet radio network on top of that network's private, internal routing system, or by implementing both routing systems in parallel at the same network layer. In such a scheme, OSPF would be responsible for routing between the packet radio network and external hosts or networks, while the packet radio network's internal routing system would handle routing of packets within the network. Similar schemes are commonly used to implement OSPF over, for example, an X.25 packet switched network or an ATM packet network, and are well-known to practitioners of the art.

However, a number of difficulties may arise if OSPF is implemented over a multi-hop, multi-access packet radio network with its own private, internal routing system. Although the private, internal routing system of such a network may enable it to appear to OSPF much like a wired network, the properties and characteristics of such radio networks are nevertheless very different from those of wired point-to-point or multi-access networks. Like an Ethernet, such radio networks link together a large number of routers; and also like an Ethernet, such networks typically provide a suite of unicast, multicast, and netwide broadcast services. However, unlike an Ethernet, such networks possess internal structure of their own. Both unicast and multicast packets may need to be relayed across the network by multiple lower-layer hops in accordance with the network's private routing scheme, and replicated many times in the process. Consequently, the cost of transport across the network is not the same for every node, but instead depends upon the location of the entrance and exit point. The traffic load on such a network may, therefore, depend just as critically upon appropriate choices of entrance and exit point, as upon efficient routing within the network.

Even worse, the structure of the radio network may fluctuate and, hence, these costs may be constantly changing due to radio mobility, interference, fading, and other causes. Furthermore, the capacity and reliability of such networks is typically much lower than for an Ethernet, and delays much longer; capacity is limited by the available radio bandwidth, reliability is reduced by increased risks of collisions, interface, noise, and fading, and by the possibility of transient routing inconsistencies at the lower layer; and delay is increased by the multi-hop relaying at the intranet layer.

Furthermore, the need to replicate packets within such a network for either unicast or multicast forwarding may introduce or exacerbate problems involved in scaling to networks with large numbers of nodes, especially large numbers of OSPF routers. This is especially unfortunate, as certain applications may require thousands of OSPF routers on such a network.

Therefore, there exists a need for systems and methods that can resolve some of the inherent problems that exist with implementing OSPF in a multi-hop, multi-access packet radio network.

SUMMARY OF THE INVENTION

Systems and methods consistent with the present invention address this need, and others, by modifying the basic OSPF algorithm to optimize it for use over a multi-hop, multi-access packet radio network while maintaining full compatibility with standard OSPF over other, adjacent networks, including wired networks. The modified OSPF algorithm, consistent with the invention, resolves the scaling problems and other issues that may be encountered if standard OSPF is employed over a multi-hop, multi-access packet radio network with its own, private internal routing system. One optimization of the modified OSPF algorithm is for routers belonging to the multi-hop, multi-access packet radio network to generate a virtual OSPF network model for the purpose of IP layer routing by OSPF that presents to OSPF routers an approximation of the true topology of the multi-hop, multi-access network as known by its private routing system in a form that can be efficiently distributed by OSPF and processed by OSPF routers. This virtual model hides most effects of intranet-layer mobility (i.e., changes in the connectivity graph) while exposing enough information about the intranet-layer topology to permit reasonable choices of entry and exit point to and from the multi-hop, multi-access packet radio network, and, thereby, minimizes the OSPF routing overhead by minimizing the rate of routing updates. This virtual model also minimizes OSPF routing overhead by minimizing the size of OSPF route advertisements and by minimizing the network degree of the virtual model.

In the virtual model, consistent with the present invention, a multi-hop, multi-access radio network may be represented as a set of multi-access links, with each being identified by its own designated router. This representation has very low average network degree (only a little greater than 2) and, hence, minimizes the size of route advertisements. Routers, consistent with the invention, may affiliate with the designated router in the same OSPF area to which they are closest. Adjacent multi-access links may be connected by connecting routers that belong to both links and/or by point-to-point links between routers in each multi-access link. A router belonging to a single multi-access link may be assumed to be able to communicate with every other router belonging to the same multi-access link at the same cost. The cost of routing a packet between routers belonging to different multi-access links may be the sum of the costs of the multi-access links traversed, and any connecting point-to-point links.

As an alternative to the above, each of the multi-access links just described may be replaced by a set of point-to-point links, arranged as a star with the router, that would have been the designated router of the multi-access link as its hub. Routers may affiliate with the hub router in the same OSPF area to which they are closest. Adjacent point-to-point stars may be connected by connecting routers that belong to both stars and/or by additional point-to-point links between routers in each star. A router belonging to a single star may be assumed to communicate with any other router belonging to the same star at a cost that is the sum of the costs of the point-to-point link from that router to the hub and from the hub to the second router. The cost of routing a packet between routers belonging to different stars may be the sum of the costs of the stars traversed, and any connecting point-to-point links. As will be appreciated, this representation is topologically almost equivalent to that of the preceeding paragraph, differing only in the specific manner of its representation by OSPF link state advertisements. In particular, it shares with the aforesaid representation the property of minimizing the average network degree, and hence routing overhead.

The virtual network model, consistent with the principles of the invention, may also include "mobile leaf routers" that may act as gateways to "mobile leaf networks," represented as separate OSPF areas or AS-external routes. These mobile leaf routers may affiliate with the standard area router closest to them. The standard area router with which a mobile leaf router affiliates appears in the virtual network model as if it were the area border router and/or AS border router advertising the mobile leaf router along with the mobile leaf networks behind it. The standard area router with which a mobile leaf router affiliates is known as its "parent" router.

Routing, consistent with the principles of the invention, may be provided within the multi-hop, multi-access network that maintains consistency with conventional OSPF shortest-path routing across this, and adjacent wired networks, while exploiting the greater detail known to the private, internal routing protocol of the multi-hop, multi-access radio network. Routing, consistent with the invention, may include advertising of the virtual network model to all OSPF routers in the routing domain in accordance with standard OSPF practices, including even those routers not aware of the special optimizations for the multi-hop, multi-access network, so that all IP routing decisions are based upon the virtual model. Routing may further include modifying the OSPF forwarding table computation on routers within the multi-hop, multi-access network itself, so that instead of choosing the IP next hop in accordance with the usual OSPF procedures the desired exit point from the multi-hop, multi-access network is chosen instead. This exit point may be the true final exit point from the network, or it may be any intermediate point at which it is desirable or necessary for IP routing to regain control (such as at an OSPF Area or AS boundary, including the parent routers of mobile leaf routers).

Routing between the entry point to the multi-hop, multi-access network and the exit point from that network may then be performed by the private routing system internal to the multi-hop, multi-access network, rather than by OSPF. This internal, private routing system takes responsibility for routing a packet within the multi-hop, multi-access radio network, with the exit point as computed by the modified OSPF algorithm becoming the destination for use by the internal, private routing system. The actual route traversed by a data packet through the multi-hop, multi-access network may thus differ from the virtual route computed by OSPF from the virtual model. However, since all OSPF routing computations are performed using the same virtual model of the network on all routers, and since the chosen exit point always lies on the same route as the next hop as would have been computed by standard OSPF procedures and is always as close or closer to the destination than the standard next hop would have been, no risk of routing loops or dead zones is introduced by this modified routing algorithm and a valid routing algorithm is obtained.

In accordance with one aspect consistent with the principles of the invention, a method for integrating a sub-network comprising multiple routers with its own private, internal routing system into a network using another, public, global routing system is provided. The method includes acquiring information as to the internal topology of the sub-network and constructing a virtual model of the sub-network in terms of constructs comprehensible to the public, global routing system of the network. The method further includes employing that virtual model together with the sub-network's private, internal routing system for the purpose of routing within the sub-network and distributing the virtual model to other routers in the network for the purpose of routing in that network.

In accordance with another aspect consistent with the principles of the invention, a method of reducing routing overhead on a network containing a sub-network consisting of a plurality of routers is provided. The method includes employing a public routing protocol on the network and employing a separate, private routing protocol internal to the sub-network. The method further includes acquiring information as to an internal topology of the sub-network and constructing a virtual model of the sub-network in terms of constructs comprehensible to the public, global routing protocol. The method also includes employing the virtual model together with the sub-network's private, internal routing protocol for the purpose of routing within the sub-network and distributing the virtual model to other routers in the network for the purpose of routing in that network.

In accordance with yet another aspect consistent with the principles of the invention, a method of constructing a virtual model of a sub-network with its own private routing protocol, wherein the sub-network comprises multiple routers, is provided. The method includes determining a network graph identifying actual connectivity among the plurality of routers and representing the sub-network as a set of links. The method further includes constructing a virtual model of the network from the actual connectivity of the network graph, wherein connectivity of the virtual model may be different than the actual connectivity of the network graph.

BRIEF DESCRIPTION OF THE DRAWINGS

The accompanying drawings, which are incorporated in and constitute a part of this specification, illustrate exemplary embodiments of the invention and, together with the description, explain the invention. In the drawings.

DETAILED DESCRIPTION

The following detailed description of the invention refers to the accompanying drawings. The same reference numbers in different drawings may identify the same or similar elements. Also, the following detailed description does not limit the invention. Instead, the scope of the invention is defined by the appended claims and their equivalents.

Systems and methods, consistent with the present invention, modify the basic OSPF algorithm (e.g., coined "Radio OSPF" herein) to optimize it for use over a multi-hop, multi-access packet radio network that has its own internal, private routing system. The modified OSPF algorithm, consistent with the present invention, utilizes a virtual network model for the purpose of IP layer routing that presents an approximation of the true topology of the multi-hop, multi-access packet network as known from its internal, private routing system. This virtual model hides most effects of intranet-layer mobility (i.e., changes in the connectivity graph) while exposing enough information about the intranet-layer topology to permit reasonable choices of entry and exit point to and from the multi-hop, multi-access packet radio network.

Exemplary Network

Figure 1A:
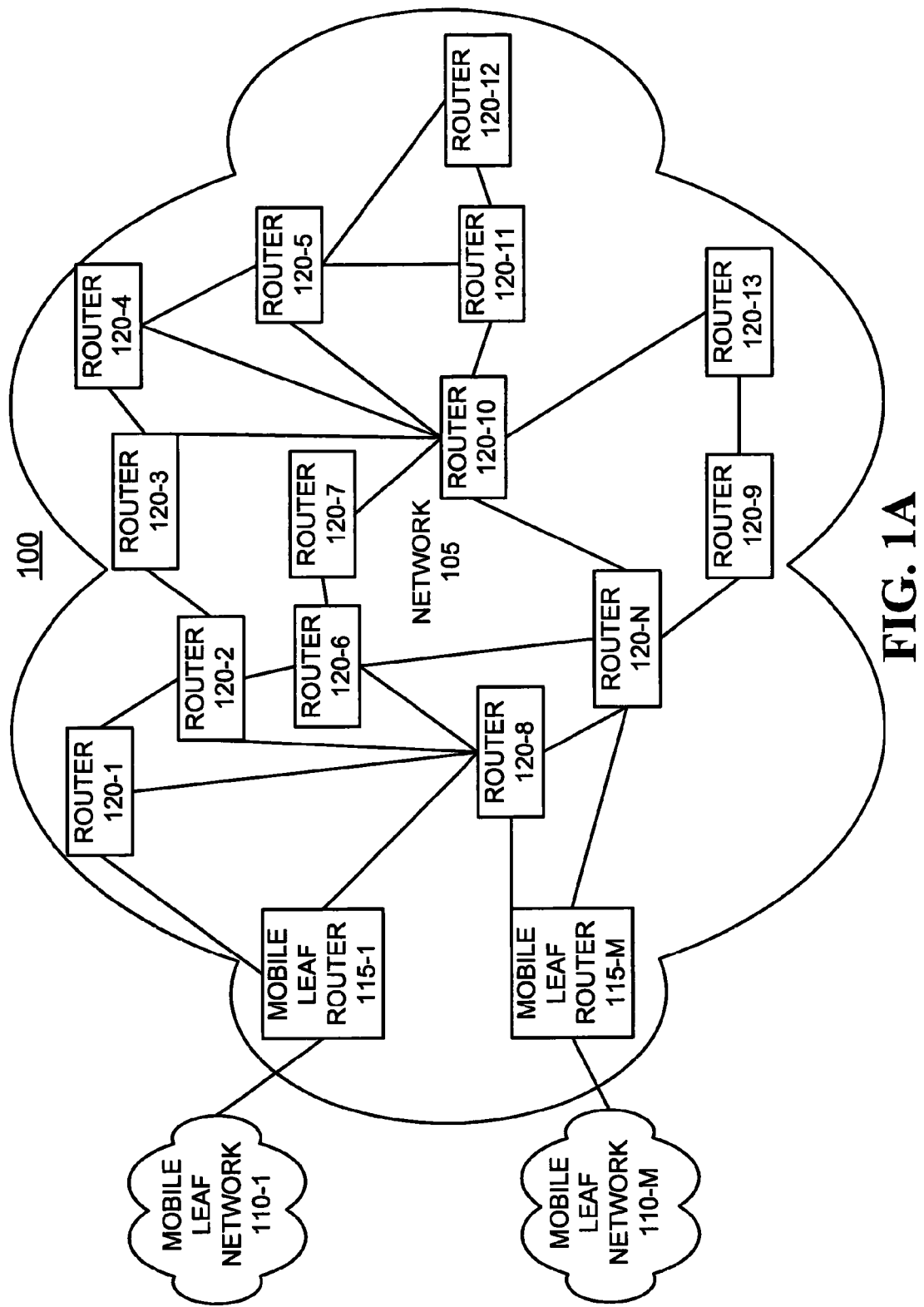
FIG. 1A illustrates an exemplary network in which systems and methods, consistent with the present invention, may be implemented for constructing a network virtual model.

FIG. 1A illustrates an exemplary network 100 in which systems and methods, consistent with the present invention, may construct a network virtual model that may be used for routing data. Network 100 may include an autonomous system (AS) that may include a central sub-network 105 interconnected with one or more mobile leaf networks 110-1 through 110-M via respective mobile leaf routers 115-1 through 115-M. Sub-networks 105 and 110 can include one or more networks of any type, including a local area network (LAN), a metropolitan area network (MAN), a wide area network (WAN), a multi-hop, multi-access packet-switched radio network, or a lower-layer Internet (IP) network such as used by IP over IP, VPN (Virtual Private Networks), or IPSec (IP Security). Network 100 may connect with other networks (not shown) that may include IPv4 or IPv6 networks.

Sub-network 105 may include multiple routers 115-1 through 115-M and 120-1 through 120-N for routing data through sub-network 105. Routers 115-1 through 115-M and 120-1 through 120-N may be interconnected via various links. Mobile leaf routers 115-1 through 115-M may route data between sub-network 105 and mobile leaf sub-networks 110-1 and 110-M, respectively. Routers 115-1 through 115-M and 120-1 through 120-N may be stationary, semi-stationary, or mobile network nodes. Mobile leaf networks 110-1 through 110-M may include networks, such as, for example, local area networks, that are mobile, i.e., whose connectivity to network 105 may change over time.

Figure 1B:
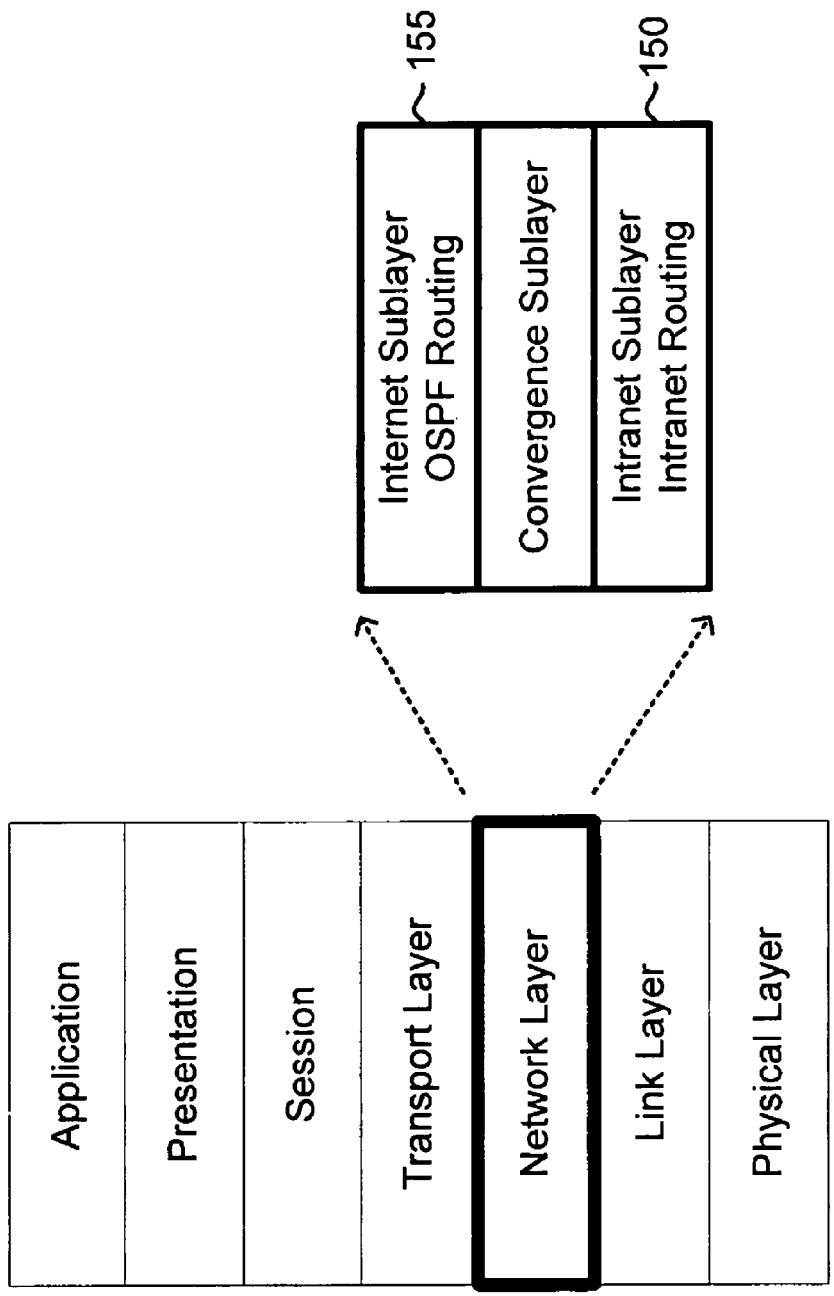
FIG. 1B illustrates an exemplary layering architecture for the network of FIG. 1A, constituting an expanded version of the ISO (International Standards Organization) layering model, that depicts the use of OSPF as an Internet routing protocol on top of a lower-layer intranet routing protocol private to sub-network 105 of FIG. 1A.

Sub-network 105 may provide its own, internal routing protocol layer for routing within sub-network 105. As shown in the protocol diagram of FIG. 1B, this internal routing protocol layer (e.g., "Intranet sublayer Intranet Routing" 150) may operate at a lower layer than the OSPF routing protocol layer (e.g., "Internet sublayer OSPF Routing" 155). This internal routing protocol layer may be responsible for routing within sub-network 105, while the OSPF routing protocol layer may be responsible for routing between and among sub-network 105, sub-networks 110-1 through 110-M, and any other external networks (not shown). Since this internal routing protocol layer is private to sub-network 105, it may not know anything about the network topology outside sub-network 105. Conversely, routers outside sub-network 105 may not participate in the internal routing protocol layer used by sub-network 105. This internal routing protocol layer may be a custom routing protocol optimized for packet radio networks, another incarnation of OSPF operating at a lower layer (as in IP over IP, VPNs, or IPSec), or any other routing protocol capable of generating the topology reports/simulated hellos described below. All links within sub-network 105 may share the same IP network address and mask or set of IP network addresses and masks. One or more hosts (not shown) may connect with sub-network 105 or sub-networks 110-1 through 110-M.

Network 100 may be divided into multiple OSPF areas, thus, introducing an element of hierarchical routing. For example, sub-network 105 of FIG. 1A may be assigned to a single standard area, and mobile leaf networks 110-1 through 110-M may each be assigned to different mobile leaf areas. In some implementations, sub-network 105 may itself be split among multiple standard OSPF areas (where a standard area is an OSPF area as defined in RFC 2328).

Typically, it may not be necessary for every router to be part of a standard OSPF area. Those routers which interconnect sub-network 105 with external networks in such a way that sub-network 105 may be intended to serve as an alternative transit network to those external networks, or the external network(s) may be intended to serve as an alternative transit network to sub-network 105, may need to be configured into a OSPF standard area.

Those routers which need not be part of a standard OSPF area may often be configured as "mobile leaf" routers instead. Mobile leaf routers, together with the networks 110 behind them, constitute "mobile leaf" areas. Mobile leaf areas may optimize the commonly occurring situation in which a router serves as a single gateway to a set of wired networks. Each mobile leaf area may include this router, known as a "mobile leaf router," together with a set of networks behind it. The mobile leaf router may form an access point between the mobile leaf networks behind it, and sub-network 105. Mobile leaf areas may be mobile, that is, the area including the mobile leaf router and the networks behind it may move around as a whole. As an area moves, its mobile leaf router may dynamically affiliate with one or another standard area router that becomes its border router. Thus, unlike standard OSPF areas whose border routers are manually configured, the border router for a mobile leaf area may be selected dynamically and may change as the mobile leaf router changes its location. These dynamically selected area border routers may be referred to hereinafter as "parent" routers.

A standard area may serve a different role in routing data as compared to mobile leaf areas. A standard area may need to be connected, but mobile leaf areas may not need to be. If a standard area partitions, it cannot be healed by routes through mobile leaf areas. However, if a mobile leaf area with two or more mobile leaf routers partitions, it can be healed by routes through a standard area.

It will be appreciated that the number of routers and mobile leaf networks illustrated in FIG. 1A is provided for explanatory purposes only. A typical network may include more or fewer routers and mobile leaf networks than are illustrated in FIG. 1A. Additionally, the various links between the routers of network 100 are shown by way of example only. More, fewer, or entirely different links may connect the various routers of network 100. There may be one or more networks filling the role of sub-network 105 in network 100. Each of these may have its own custom private internal routing system. In addition, network 100 may contain other sub-networks (not shown).

Exemplary Connectivity Graph

Figure 2:
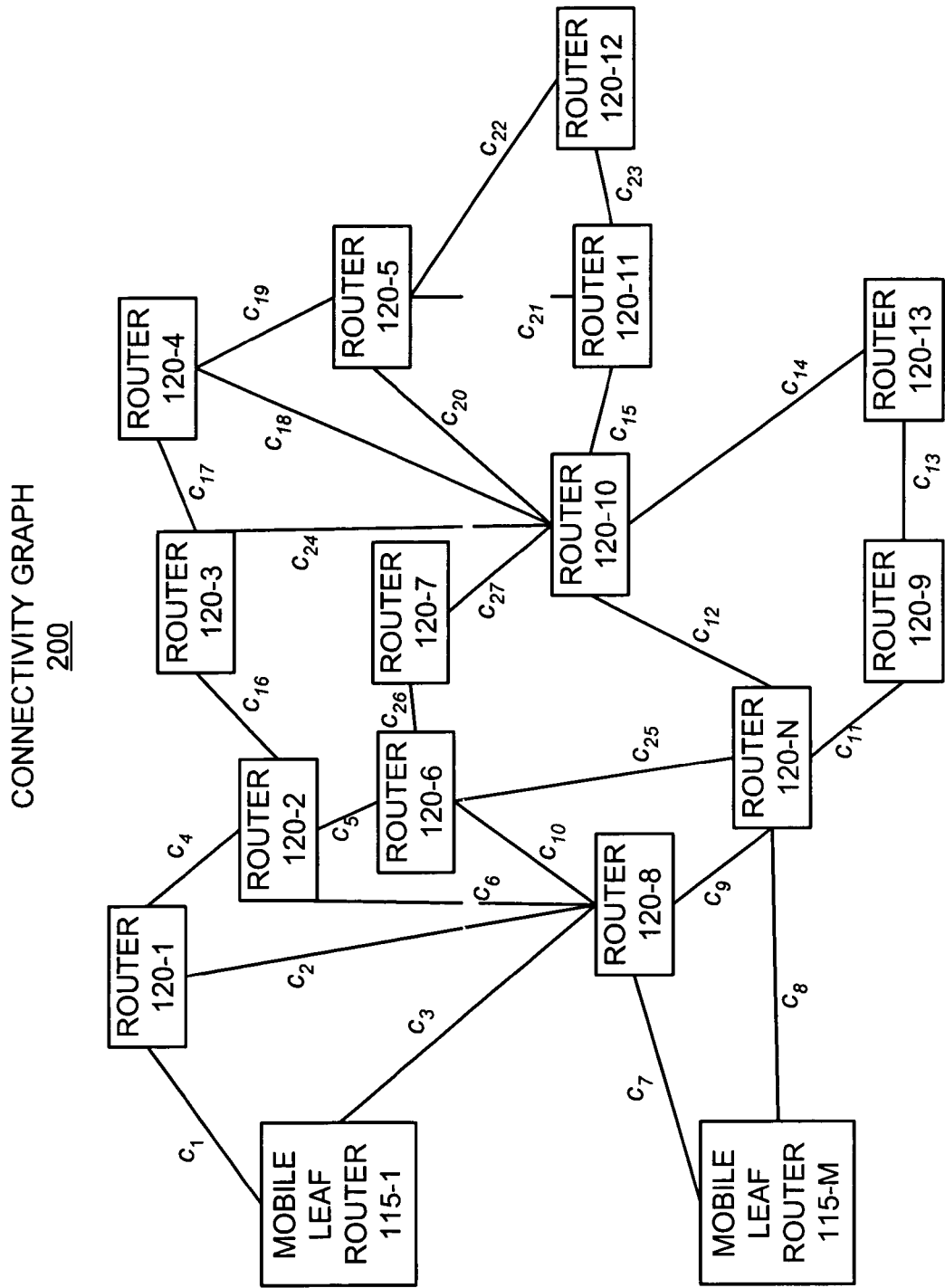
FIG. 2 illustrates an exemplary connectivity graph associated with the network of FIG. 1A consistent with the present invention.

FIG. 2 illustrates an exemplary connectivity graph 200 that represents the actual connectivity of network 105. Each router 120 may represent a vertex in graph 200, and each one-hop link may be an edge. Each edge may be directed (i.e., uni-directional or bi-directional) and may be decorated by a cost (e.g., $c_1$, $c_2$, $c_3$, etc.), or set of costs, that provides an indication of the desirability of sending traffic over the associated link. Connectivity graph 200 may be constructed at each router 120 from HELLO messages that are received from other routers in network 105. Alternatively, connectivity graph 200 may be constructed at each router 120 from "simulated HELLO" messages generated by an internal protocol private to network 105, which describes the connectivity of network 105 as known to its private internal routing protocol. The "simulated HELLO" messages may, for example, include the "topology reports" described in co-pending U.S. patent application Ser. No. 09/546,052, entitled "Radio Network Routing Apparatus."

Exemplary Network Virtual Model

Figure 3:
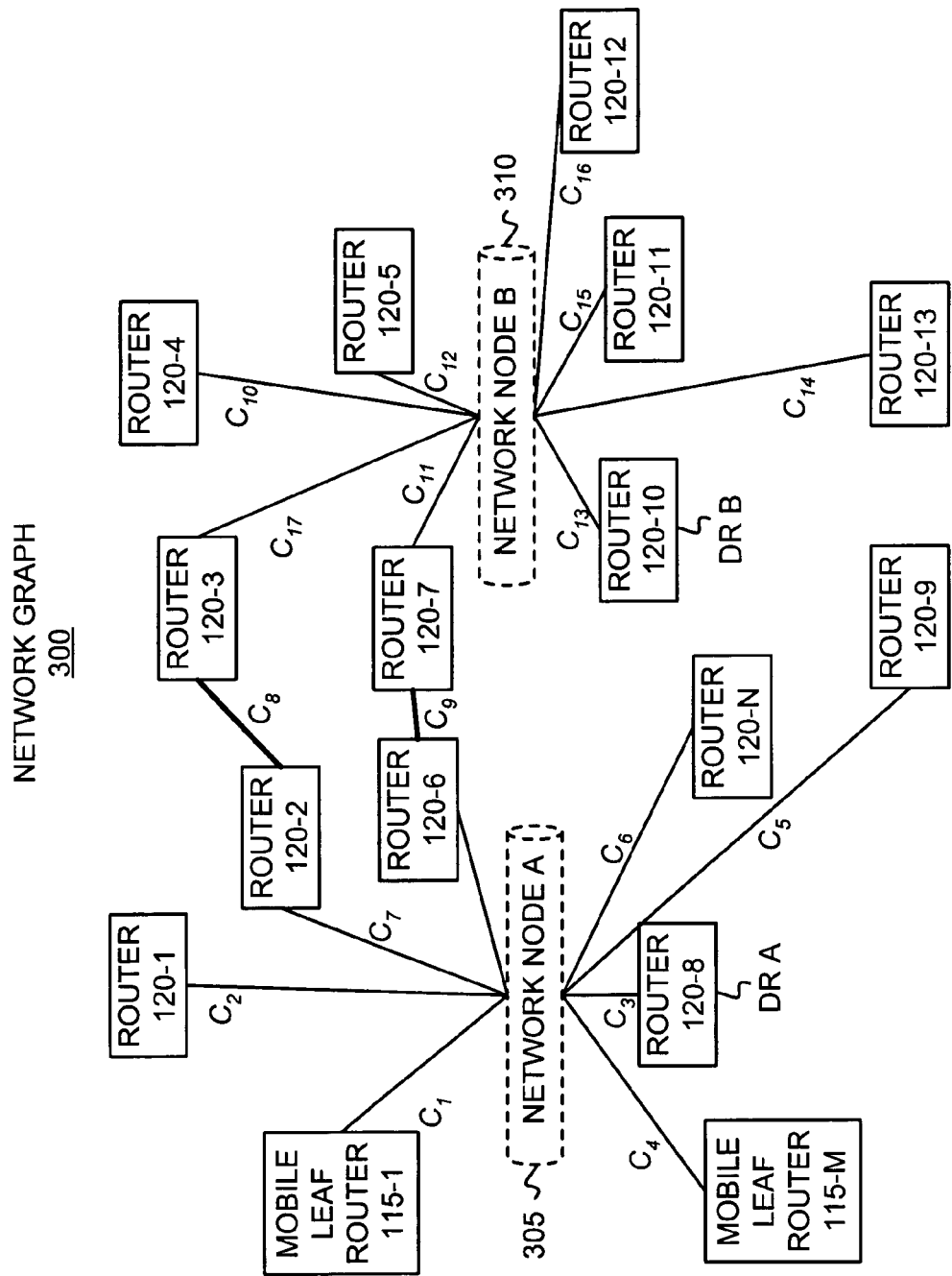
FIG. 3 illustrates an exemplary advertised network graph, associated with the connectivity graph of FIG. 2, that may serve as a network virtual model consistent with the present invention.

FIG. 3 illustrates an exemplary network graph 300 that may represent a virtual model of network 105, and may be advertised from each router 120 to other routers of network 100. Graph 300 may represent a virtual model in the sense that it need not correspond to the actual connectivity of the underlying network 105. A network graph 300 may be used at each router 120 for the purpose of performing routing computations. The virtual model of network 105 may include one or more virtual multi-access networks that are headed by a network node in graph 300, which does not correspond to an actual router but are instead generated somewhat fictitiously by a "designated router" (DR). For example, graph 300 depicts two network nodes A 305 and B 310 that are implemented by DR A 120-10 and DR B 120-12. There may be one or more designated routers in network 105 and, hence, more than one network node in network 105. Each of these network nodes together with the router nodes adjacent to it constitutes a separate virtual multi-access network. Network 105 may thus be represented in the virtual model as if it were split among multiple multi-access networks, all of which may share the same IP network address and mask. Each virtual multi-access network may be connected to others by point-to-point links via connecting routers. For example, the virtual multi-access network headed by network node A 305 may connect with the virtual multi-access network headed by network node B 310 by a point-to-point link between routers 120-2 and 120-3 and by another point-to-point link between routers 120-8 and 120-9. Alternatively, adjacent virtual multi-access networks could be connected by routers belonging to both virtual multi-access networks, e.g., adjacent to both network node A 305 and network node B 310 (not shown). Each edge of graph 300 may be decorated by an advertised cost (e.g., $C_1$, $C_2$, $C_3$, etc.) of a corresponding link.

Exemplary Router Configuration

Figure 4:
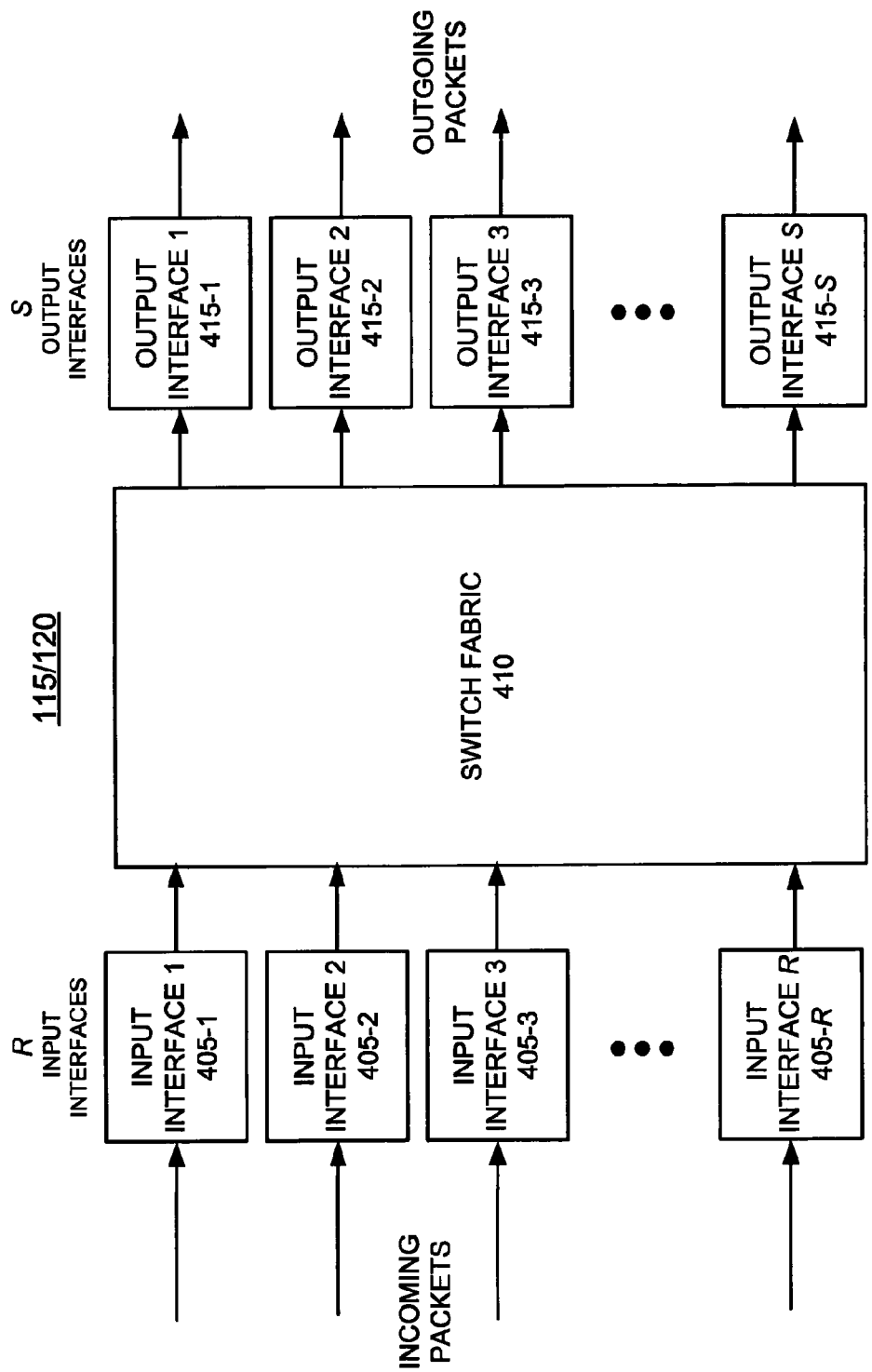
FIG. 4 illustrates an exemplary router configuration consistent with the present invention.

FIG. 4 illustrates exemplary components of a router 115/120 consistent with the present invention. In general, each router 115/120 receives incoming packets, determines the next destination (the next "hop" in sub-network 105) for the packets, and outputs the packets as outbound packets on links that lead to the next destination. In this manner, packets "hop" from router to router in sub-network 105 until reaching their final destination.

As illustrated, router 115/120 may include multiple input interfaces 405-1 through 405-R, a switch fabric 410, and multiple output interfaces 415-1-415-S. Each input interface 405 of router 115/120 may further include routing tables and forwarding tables (not shown). Through the routing tables, each input interface 405 may consolidate routing information learned from the routing protocols of the network. From this routing information, the routing protocol process may determine the active route to network destinations, and install these routes in the forwarding tables. Each input interface 405 may consult a respective forwarding table when determining a next destination for incoming packets. This consultation may involve a two-step process. For instance, certain input interface 405 may first consult a forwarding table constructed by OSPF to determine the desired exit point from network 105, and then a second forwarding table constructed by the private internal routing protocol of network 105 to determine the actual next destination.

In response to consulting a respective forwarding table, each input interface 405 may either set up switch fabric 410 to deliver a packet to its appropriate output interface 415, or attach information to the packet (e.g., output interface number) to allow switch fabric 410 to deliver the packet to the appropriate output interface 415. Each output interface 415 may queue packets received from switch fabric 410 and transmit the packets on to a "next hop."

Exemplary Standard Area Router Virtual Model Construction Process

Figure 5:
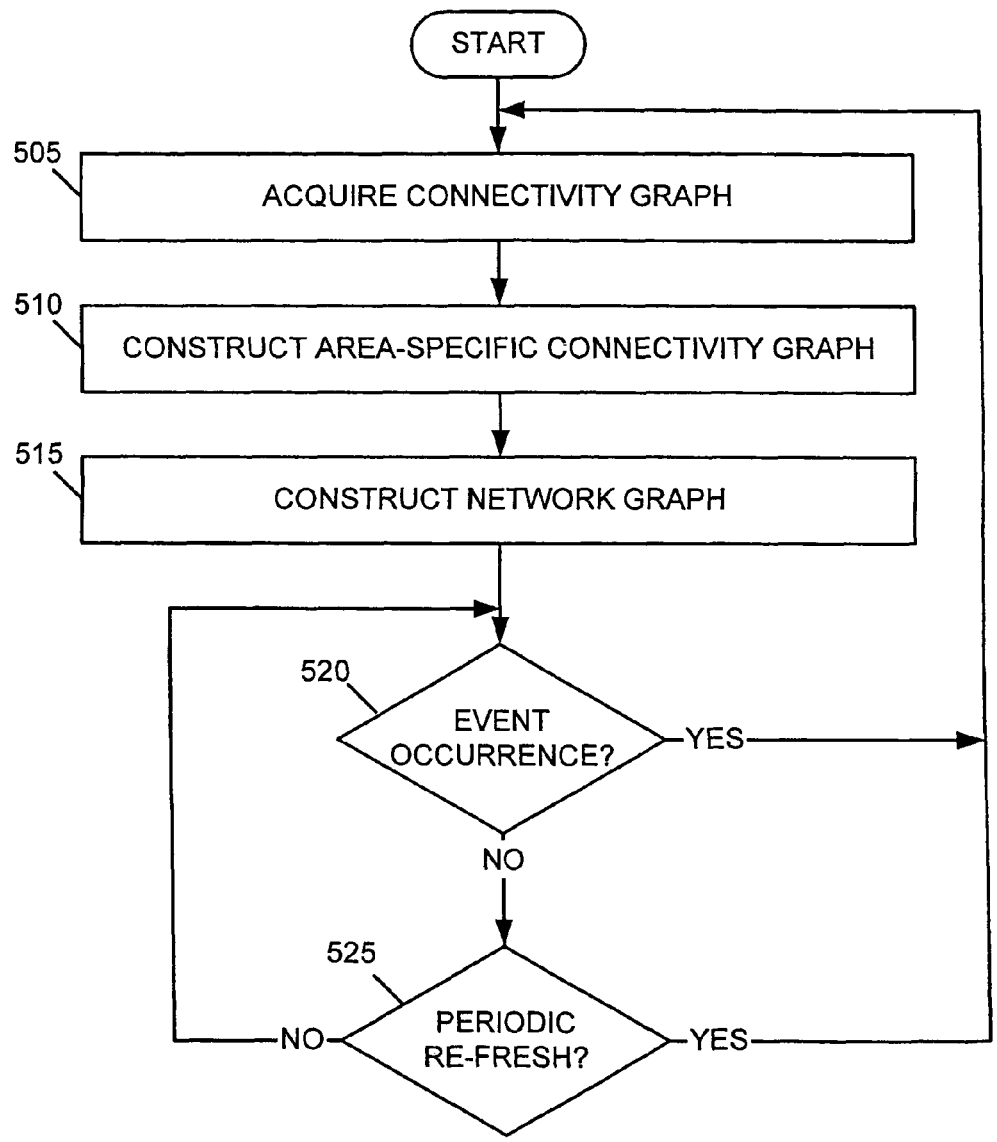
FIG. 5 is a flow chart that illustrates an exemplary process, consistent with the present invention, for constructing a network virtual model at a router in a standard area of the network of FIG. 1A.

FIG. 5 is a flow chart that illustrates an exemplary process, consistent with the present invention, for constructing and updating a virtual model of network 105 at a standard area router 120 within network 105. A "virtual model" as described herein may refer to a network graph that is used by the public routing system for routing purposes where the network graph may not correspond to the actual connectivity of sub-network 105 as determined by the private routing system of network 105. The exemplary process may begin with the acquisition of a connectivity graph [act 505]. The connectivity graph may be constructed from simulated HELLO messages that are received from a private routing protocol internal to sub-network 105. These simulated HELLO messages may inform router 120 as to the set of other routers in network 105, their distance from router 120, and their set of one-hop neighbors and distance to each. From these simulated HELLO messages, router 120 can determine its own set of one-hop neighbors, and whether or not it has bi-directional connectivity to each such neighbor. From the simulated HELLO messages, router 120 may construct a graph representing the connectivity with at least a set of other routers in sub-network 105. The simulated HELLO messages discussed above may include the "topology reports" described in co-pending U.S. patent application Ser. No. 09/546,052, entitled "Radio Network Routing Apparatus."

Each standard area router 120 may then construct an area-specific connectivity graph [act 510]. The area-specific connectivity graph may be constructed from the overall connectivity graph for sub-network 105 by eliminating routers that do not belong to the same area and compensating for that by adding additional links and/or adjusting costs of existing links. A router may determine which other routers belong to its area, based upon the IP address of the other router's interface onto sub-network 105, as each area may be assigned a distinct address range. Mobile leaf routers may be identified in the same way, and do not belong to any standard area.

Router 120 may construct all or part of a network graph 300 [act 515], based upon information contained in the connectivity graph acquired from the private routing algorithm of network 105 and information distributed by OSPF among OSPF routers. This network may represent an approximation to the connectivity graph for network 105, restructured so as to permit efficient representation via OSPF of the actual connectivity graph. The network graph 300 may include a set of links that the router may advertise in its own router links advertisements. The set of links chosen may define the network graph 300 that further defines a virtual model of network 105 that may be employed for routing computations. This model may include a set of virtual multi-access networks, each headed by a "designated router", and point-to-point links connecting these virtual multi-access networks. Designated routers may be elected, from standard area routers within a standard area, by a distributed algorithm based in part upon the information contained in the connectivity graph.

A determination may be made whether one or more specified events have occurred [act 520]. The specified events may include, for example, changes to the connectivity graph that may occur when simulated HELLO messages are monitored. If one or more specified events have occurred, the exemplary process may return to act 505 to re-fresh the advertised network graph. For example, if changes to the connectivity graph are noted, then router 120 may re-initiate acts 505-515. If one or more of the specified events have not occurred, then a determination may be whether it is time for a periodic re-fresh [act 525]. For example, acts 505-515 may be re-initiated on a periodic basis (i.e., a periodic "refresh"). If it is not time for a periodic re-fresh, the exemplary process may return to act 520. If it is time for a periodic re-fresh, then the exemplary process may return to act 505.

Exemplary Standard Area Router Connectivity Graph Acquisition Process

Figure 6:
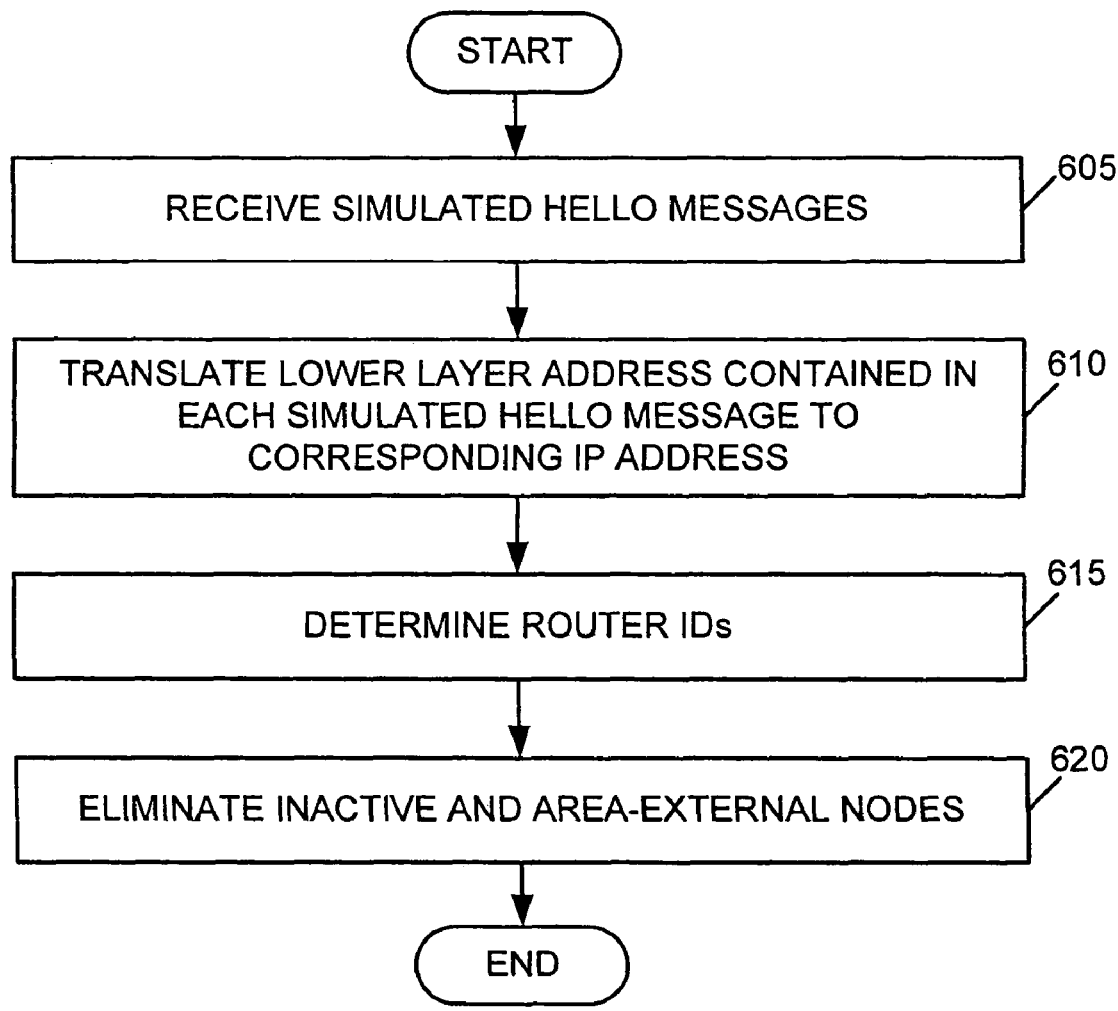
FIG. 6 is a flow chart that illustrates an exemplary process, consistent with the present invention, for acquiring a connectivity graph at a standard area router in the network of FIG. 1A.

FIG. 6 is a flow chart that illustrates an exemplary process, consistent with the present invention, for acquiring a connectivity graph at a standard area router 120 of network 105. The acts of the exemplary process of FIG. 6 provide further detail to act 505 of FIG. 5.

The exemplary process may begin with the receipt of simulated HELLO messages [act 605]. Simulated HELLO messages may be generated by a private routing protocol internal to network and may include, for example, data specifying the type of node represented by the simulated HELLO, the lower layer address of the node's interface onto sub-network 105, and a cost of the remote node from router 120. A private routing protocol may generate a simulated HELLO message representing each router 120 in sub-network 105 every HELLOINTERVAL seconds, where HELLOINTERVAL is a parameter that specifies an exact periodic interval for sending the HELLO messages. HELLOINTERVAL need not be the same for every router so represented and may change dynamically. Alternatively, the private routing protocol may generate a simulated HELLO message representing a router 120 in sub-network 105 in response to some event, such as receipt of a routing update through the private routing protocol.

A lower layer address contained in each received simulated HELLO message may be translated into a corresponding Internet Protocol (IP) address [act 610]. This translation may be performed by a mechanism, such as, for example, Ethernet ARP. OSPF Router IDs may then be determined [act 615]. The OSPF Router ID associated with each router 120 in sub-network 105 may be determined from OSPF link-state advertisement packets, database description packets, link-state request packets, or other OSPF protocol packets received at a respective router 120. Inactive, area-external nodes, and mobile leaf routers may be eliminated from the connectivity graph [act 620]. Routers identified by a flag in their simulated HELLO messages as being not active may be eliminated from the connectivity graph. Additionally, routers belonging to a different area, and mobile leaf routers, may be eliminated from the connectivity graph (i.e., a network graph that includes vertexes at each router and edges between each vertex). Routers may be eliminated from the connectivity graph by first considering a set of all the vertices adjacent to the vertex to be eliminated. The vertex to be eliminated and all edges leading to it may be deleted from the graph. Then, new edges may be inserted connecting all vertices to which the deleted vertex had previously been adjacent, and assigned costs equal to the sum of the costs along the two edges that it replaces. This process may be repeated until all such vertices have been eliminated.

Figure 7:
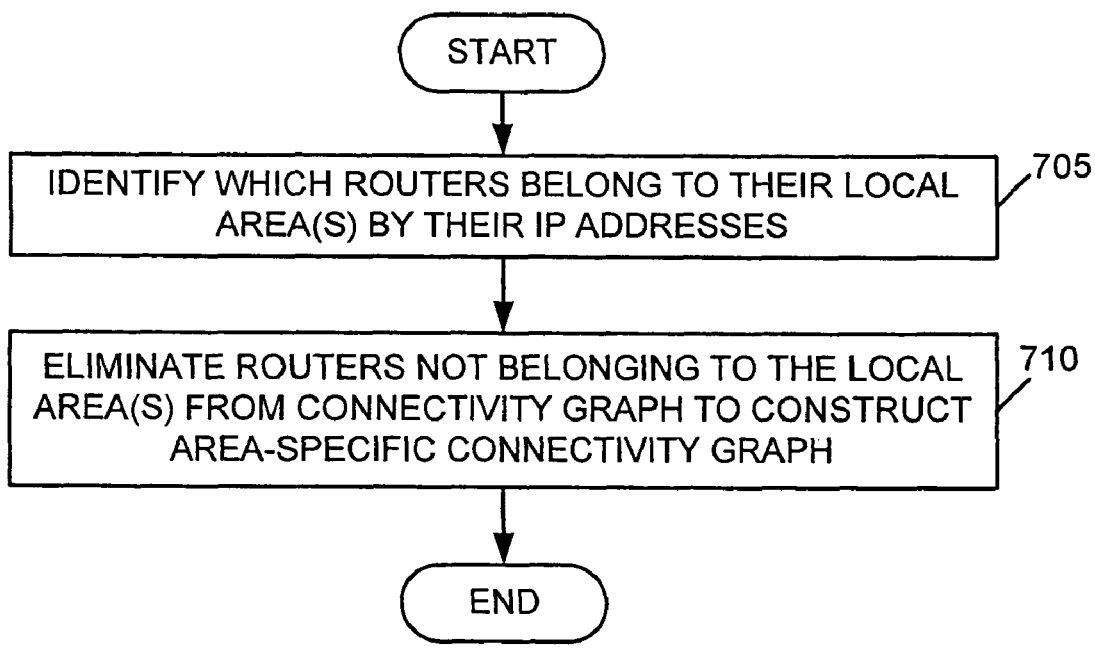
FIG. 7 is a flow chart that illustrates an exemplary process, consistent with the present invention, for acquiring an area-specific connectivity graph at a standard area router in the network of FIG. 1A.

Exemplary Standard Area Router Area-Specific Connectivity Graph Construction Process FIG. 7 is a flow chart that illustrates an exemplary process, consistent with the present invention, for constructing an area specific connectivity graph at a standard area router 120. The acts of the exemplary process of FIG. 7 provide further detail to act 510 of FIG. 5.

The exemplary process may begin with the identification of which routers belong to router 120's local area(s) by their IF addresses [act 705]. Each area may correspond to a distinct address range, which may be defined by a static configuration table. A standard area router may look up the IP address of another router's interface on sub-network 105 to determine the area to which it is assigned. Likewise, all mobile leaf routers may be assigned to a distinct address range. A given router may also belong to two or more areas. In such a case, it may have two or more IP addresses assigned to its interface onto sub-network 105, one in each area. Routers not belonging to the local area(s) may be eliminated from the connectivity graph to construct an area-specific connectivity graph [act 710]. Routers may be eliminated from the connectivity graph by first considering a set of all the vertices adjacent to the vertex to be eliminated (i.e., the vertex corresponding to the router to be eliminated). The vertex to be eliminated and all edges leading to it may be deleted from the graph. Then, new edges may be inserted connecting all vertices to which the deleted vertex had previously been adjacent, and assigned costs equal to the sum of the costs along the two edges that it replaces. This process may be repeated until all such vertices have been eliminated.

Exemplary Standard Area Network Graph Construction Process

Figure 8:
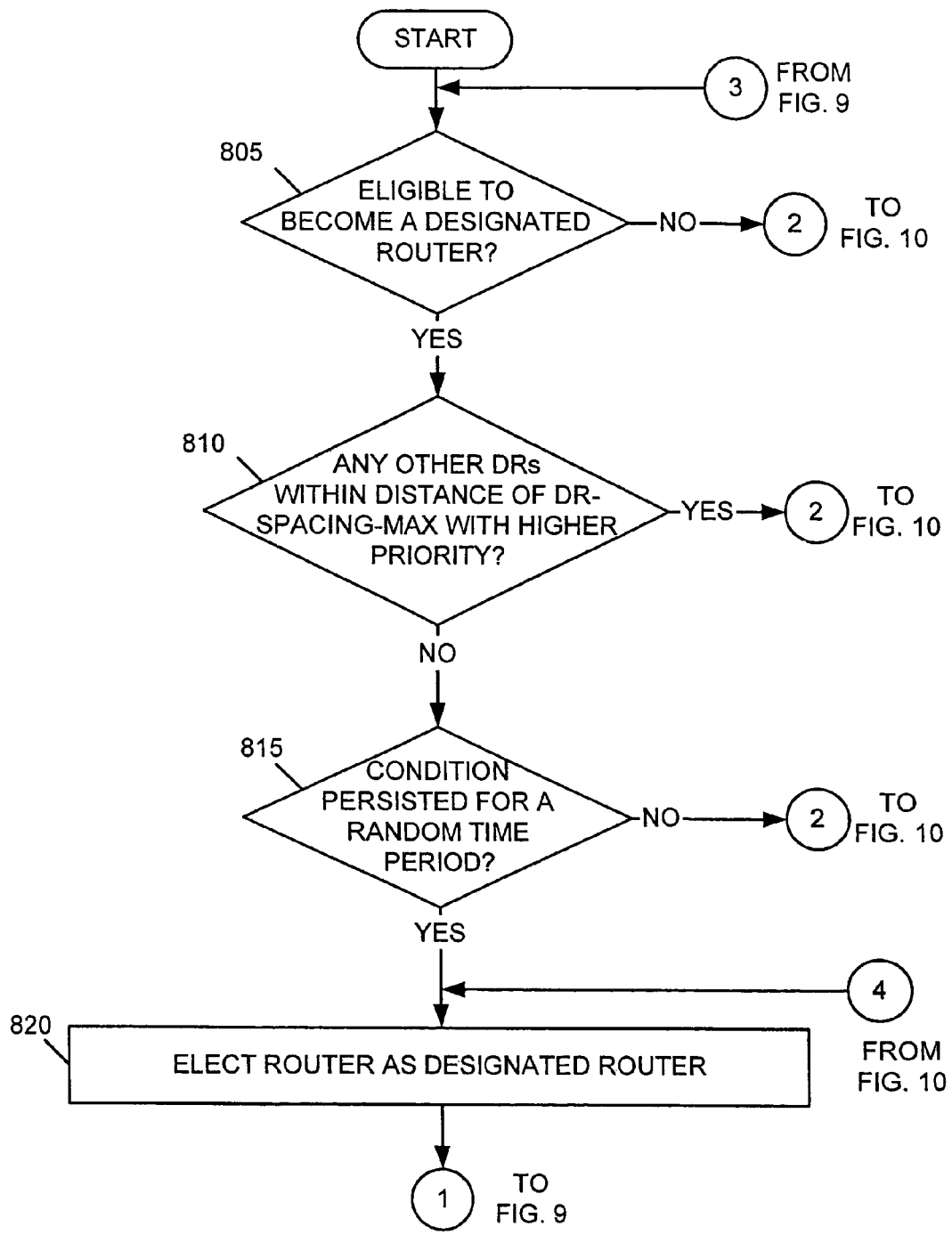
FIGS. 8-10 are flow charts that illustrate an exemplary process, consistent with the present invention, for constructing a network graph at a standard area router in the network of FIG. 1A.
Figure 9:
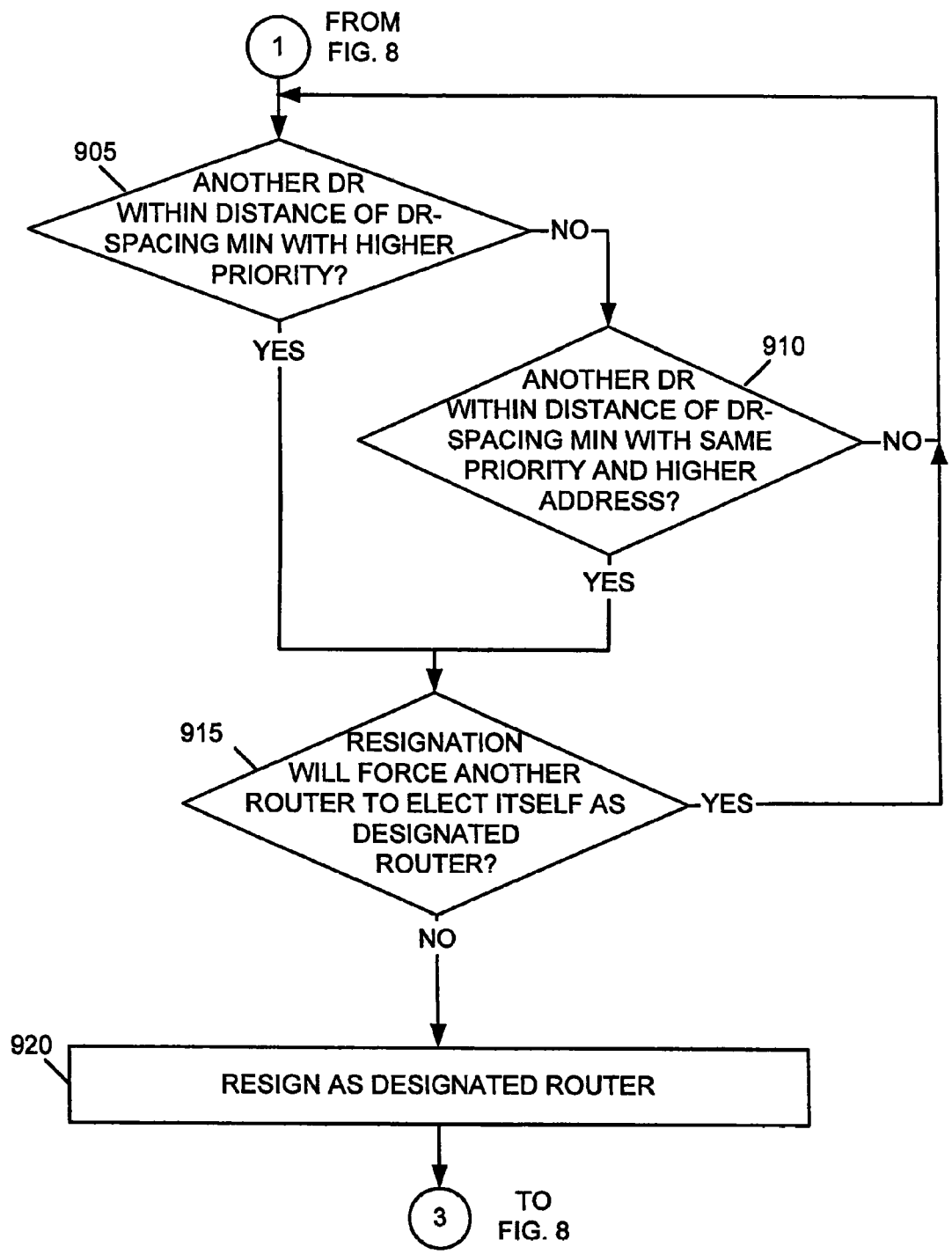
Figure 10:
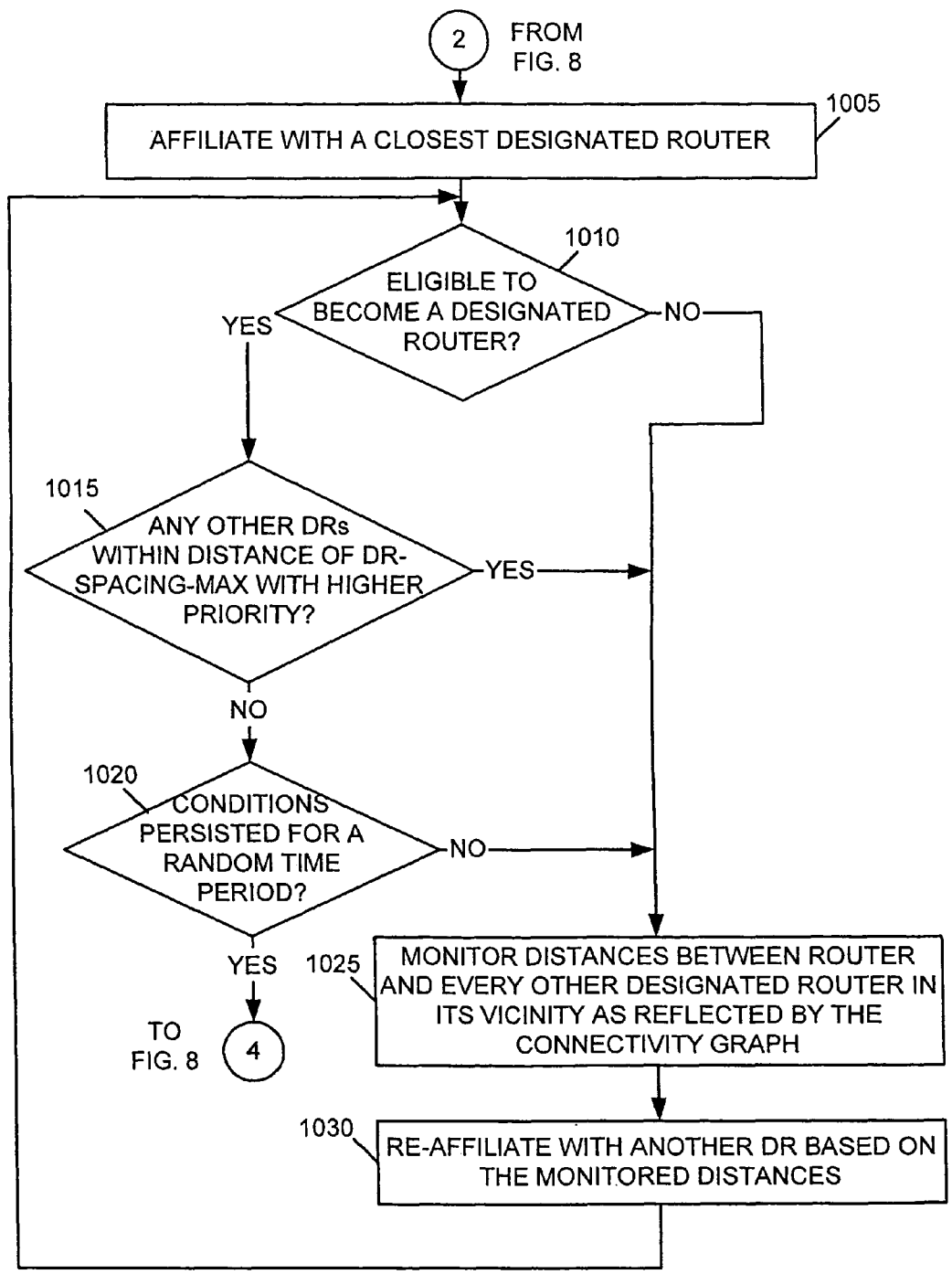

FIGS. 8-10 are flow charts that illustrate an exemplary process, consistent with the present invention, for constructing a network graph 300, that represents a virtual model of sub-network 105, at a router 120 of sub-network 105. The acts of the exemplary process of FIGS. 8-10 provide further detail to act 515 of FIG. 5.

The virtual model constructed by the exemplary process of FIGS. 8-10 represents an approximation to the true topology of network 105, as it is known from the connectivity graph. The link or edge costs of this model may likewise be an approximation of the true costs, as they would have been computed from the connectivity graph. The virtual model enables routers anywhere in network 100 to compare routes through sub-network 105 with others that may not traverse sub-network 105, and to select reasonably optimal choices of entry and exit points to and from sub-network 105. At the same time, the virtual model hides most mobility-related changes from the IP layer.

The exemplary process may begin with a determination whether router 120 is eligible to become a designated router (DR) [act 805]. A designated router may serve to define a multi-access network advertised as part of the virtual model. There may be one or more designated routers for a single sub-network 105. The designated router used to represent a multi-access network in the virtual model need not be the same as any designated router that may play a privileged role in the flooding of OSPF link-state advertisements. Only standard area routers may be eligible to become a DR in sub-network 105 and mobile leaf routers may not head a multi-access network as its designated router.

Routers may be assigned a priority for election as a designated router. For example, two special priority values may be reserved: never (=0) and always (=255). A router assigned a priority of never may never be eligible for election as a designated router. A router assigned a priority of always may always elect itself as designated router. Priority values between never and always indicate that the router may be chosen as designated router, with the priority indicated. This priority information may be flooded between routers in sub-network 105 such that every router knows the designated router election priority of all other routers in its vicinity. If router 120 is not eligible to become a designated router, then the exemplary process may continue at act 1005 below. If router 120 is eligible to become a designated router, then router 120 may determine if any other DRs are located within a distance of DR-SPACING-MAX of router 120 and have a higher priority [act 810]. DR-SPACING-MAX may include a value indicating a maximum distance DRs should be apart. For example, DR-SPACING-MAX may equal 3 hops in some implementations. If other DRs are located within a distance of DR-SPACING-MAX of router 120 and have a higher priority, the exemplary process may continue at act 1005 below. If no other DRs are located within a distance of DR-SPACING-MAX of router 120, or don't have a higher priority, then a determination may be made whether conditions in acts 805 and 810 have persisted for a random time period [act 815]. If not, the exemplary process may continue at act 1005 below. If so, then router 120 may be elected as a designated router [act 820].

Router 120 may then determine whether another DR, with higher priority, is located within a distance of DR-SPACING-MIN of router 120 [act 905]. DR-SPACING-MIN may include a value indicating a minimum distance DRs should be apart. For example, DR-SPACING-MIN may equal 2 hops in some implementations. As long as the process of flooding OSPF route advertisements through network 105 does not itself depend upon the choice of designated routers, router 120 can determine what other routers in its vicinity in sub-network 105 have declared themselves to be designated routers, by monitoring the OSPF Network Links Advertisements emitted by such routers and flooded throughout network 100 (including sub-network 105). If the flooding process does not meet this criterion, then designated routers may advertise themselves by means of beacons broadcast, or multicast, to its neighbors through mechanisms provided by the internal routing protocol private to sub-network 105, and router 120 can determine what routers in its vicinity have declared themselves to be designated routers, by monitoring these beacons. If another DR, with higher priority, is not located within a distance of DR-SPACING-MIN of router 120, router 120 may determine whether another DR is located within a distance of DR-SPACING-MIN with a same priority and a higher network address [act 910]. If not, the exemplary process may return to act 905. If router 120 determines that either another DR is located within a distance of DR-SPACING-MIN of router 120 and has a higher priority, or another DR is located within a distance of DR-SPACING-MIN of router 120 with a same priority and a higher address, then router 120 may determine whether resigning as a designated router will force another router to elect itself as a designated router [act 915]. If not, router 120 may resign as a designated router [act 920] and the exemplary process may continue at act 805. If router 120 determines the resigning as a designated router will force another router to elect itself as a designated router, then router 120 may not resign as a designated router and the exemplary process may return to act 905.

If any of the three conditions of acts 805, 810 or 815 above were not met, then router 120 may affiliate with a closest designated router [act 1005]. Router 120 may determine the closest designated router from information contained in the connectivity graph constructed by simulated HELLOs from the private, internal routing protocol of network 105. This distance information may be modified, for example, by other configured information so as to establish a preference for affiliation with particular routers. Router 120 may affiliate with a designated router by listing it in its OSPF router links advertisement as a network link. The designated router may reciprocate by listing the affiliated router in its corresponding OSPF network links advertisement.

While it is affiliated with a designated router, Router 120 may intermittently check to see if it should reaffiliate with a different designated router, or promote itself to the status of designated router. It may do so either periodically, or in response to some event, such as a change in the topology of network 105 as reported via simulated HELLO messages and represented by a change in the connectivity graph. To do so, router 120 may determine whether it is eligible to become a designated router [act 1010]. If so, router 120 may determine whether any other DRs are within a distance of DR-SPACING-MAX of router 120 with a higher priority [act 1015]. If not, then router 120 may determine whether the conditions of acts 1010 and 1015 have persisted for a random time period [act 1020]. If the conditions have persisted for the random time period, then router 120 should promote itself to designated router and the exemplary process may continue at act 820. If not, the exemplary process may continue at act 1025.

Returning to act 1015, if router 120 determines that other DRs are within a distance of DR-SPACING-MAX of router 120 with a higher priority, router 120 may check to see if it should reaffiliate with one of these other DRs. To prevent bouncing back and forth among different DRs, router 120 should not reaffiliate simply because it is now closer to some other DR, but rather should apply a hysteresis check. To do so, router 120 may monitor distances between itself and every other designated router in its vicinity, as reflected by the connectivity graph [act 1025], over time. For example, let $c_i$ be router 120's cost to the $i^{th}$ designated router, and c be the cost to router 120's current designated router (both c and $c_i$ may change with time). The time-integral of the advantage ($C_{advantage}$) of switching to a different designated router may be computed by the following relation:

$$C_{advantage} = \int max_i((c(t) - c_i(t)))dt \qquad \text{Eqn. (1)}$$

Router 120 may then re-affiliate with another DR based on the monitored distances [act 1030]. For example, if $C_{advantage}$ exceeds a configurable threshold value, then router 120 may re-affiliate with the corresponding designated router, which is now closest. These costs $c_i$ may be adjusted, for example, by configurable values, so as to create a preference for router 120 to affiliate with particular designated routers.

Exemplary Mobile Leaf Router Virtual Model Construction Process

Figure 11:
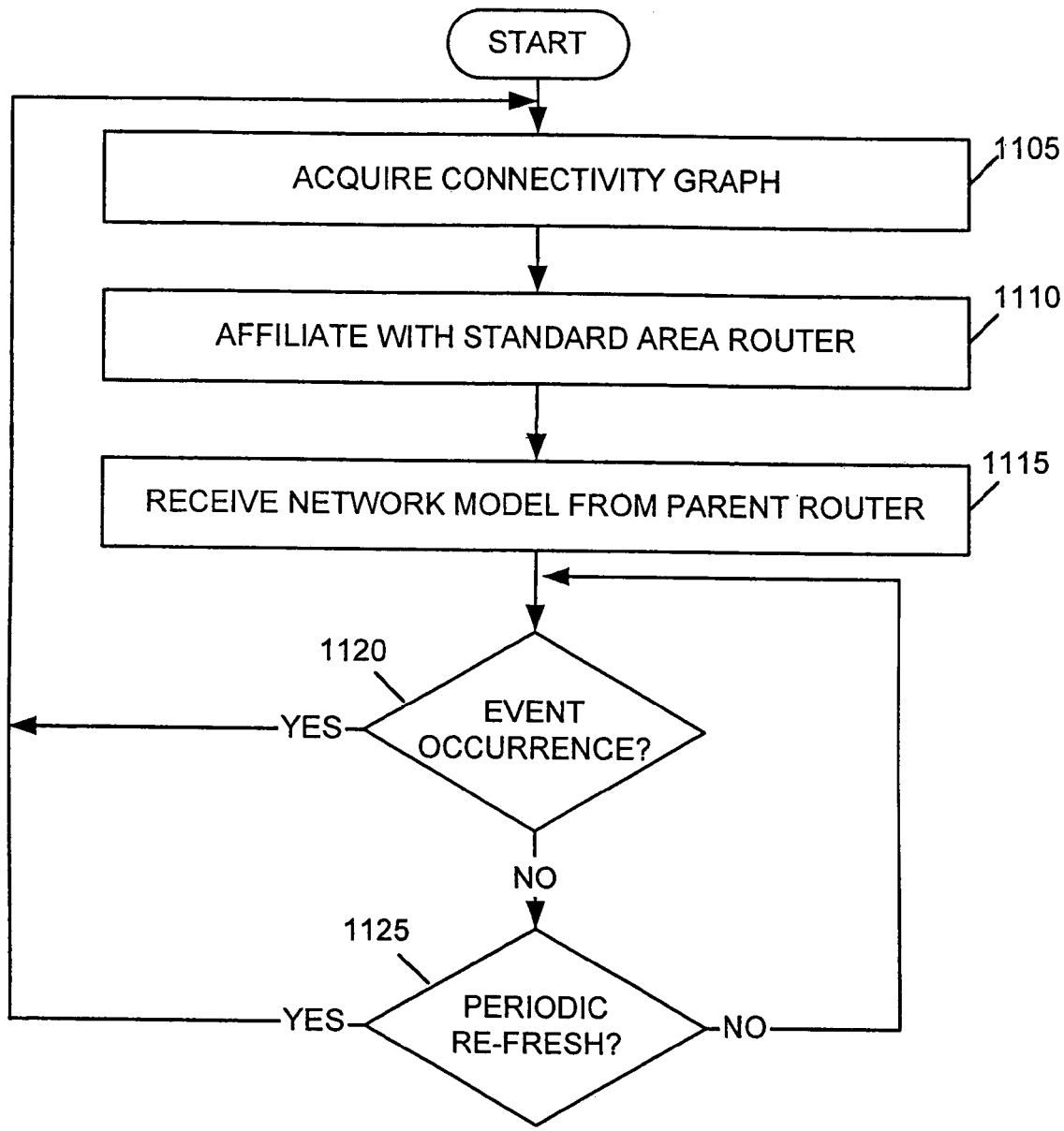
FIG. 11 is a flow chart that illustrates an exemplary process, consistent with the present invention, for constructing a network virtual model at a mobile leaf router in the network of FIG. 1A.

FIG. 11 is a flow chart that illustrates an exemplary process, consistent with the present invention, for constructing and updating a virtual model of network 105 at a mobile leaf router 115 within network 100. A "virtual model" as described herein may refer to a network graph 300 that is used for routing purposes where network graph 300 may not correspond to the actual connectivity of network 105.

The exemplary process may begin with the acquisition of a connectivity graph [act 1105]. The connectivity graph may be constructed from simulated HELLO messages that are received from an internal routing protocol private to network 105. These simulated HELLO messages may inform the mobile leaf router 115 as to the set of other routers in network 105, their distance from router 115, and their set of one-hop neighbors and distance to each. From these simulated HELLO messages, router 115 can determine its own set of one-hop neighbors, and whether or not it has bi-directional connectivity to each such neighbor. From the simulated HELLO messages, router 115 may construct a graph representing the connectivity with at least a set of other routers in network 105.

The router 115 may then affiliate with a standard area router (i.e., the "parent" router)[act 1110]. Initially, mobile leaf router 115 may affiliate with a closest standard area router. As mobile leaf router 115 moves around, it may re-affiliate as needed to present a reasonable model of the network. Mobile leaf router 115 may affiliate with any standard area router, regardless of whether or not it is a designated router. The parent router may serve as a border router between the standard area and the area whose sole member in sub-network 105 is the mobile leaf router 115. Mobile leaf router 115 may then receive the network model (including the parent router's virtual model of network 105) advertised by the parent router [act 1115]. The parent router may advertise this model in a simplified form, consisting, for example, of just a single default route with itself as "next hop." In an alternative implementation, mobile leaf router 115 may generate this default route itself. Conversely, mobile leaf router 115 may incorporate the mobile leaf router 115 and the mobile leaf networks behind it into its model of the network by representing them, for example, by means of one or more OSPF AS-external or Area Summary route advertisements.

A determination may be made whether one or more specified events have occurred [act 1120]. Router 120 may, for example, monitor simulated HELLO messages looking for changes to the connectivity graph. If one or more specified events have occurred, then the exemplary process may return to act 1105 to re-fresh the network graph 300. For example, if changes to the connectivity graph are noted, then mobile leaf router 115 may re-initiate acts 1105-1115. If one or more of the specified events have not occurred, then a determination may be whether it is time for a periodic re-fresh [act 1125].

For example, acts 1105-1115 may be re-initiated on a periodic basis (i.e., a periodic "re-fresh"). If it is not time for the periodic re-fresh, then the exemplary process may return to act 1120. If it is time for a periodic re-fresh, then the exemplary process may return to act 1105.

Exemplary Mobile Leaf Router Connectivity Graph Acquisition Process

Figure 12:
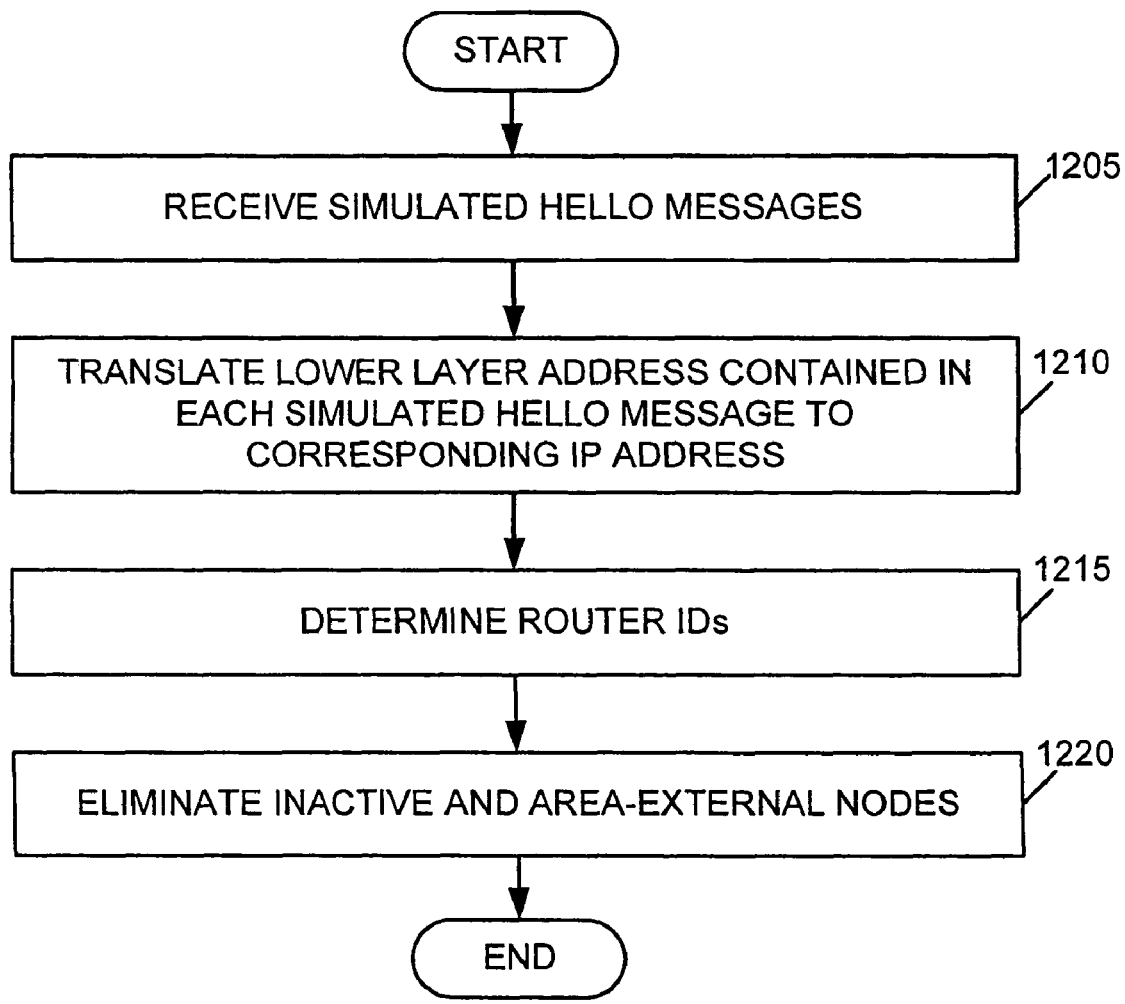
FIG. 12 is a flow chart that illustrates an exemplary process, consistent with the present invention, for acquiring a connectivity graph at a mobile leaf router in the network of FIG. 1A.

FIG. 12 is a flow chart that illustrates an exemplary process, consistent with the present invention, for acquiring a connectivity graph at a mobile leaf router 115 of network 100. The acts of the exemplary process of FIG. 12 provide further detail to act 1105 of FIG. 11.

The exemplary process may begin with the receipt of simulated HELLO messages [act 1205]. Simulated HELLO messages may be generated by a private routing protocol internal to sub-network 105 and may include, for example, data specifying the type of node represented by the simulated HELLO message, the lower layer address of the node's interface onto sub-network 105 and a cost of the remote node from router 115. A private routing protocol may generate a simulated HELLO message representing each router 120 in sub-network 105 every HELLOINTERVAL seconds, where HELLOINTERVAL is a parameter that specifies an exact periodic interval for sending the HELLO messages.

HELLOINTERVAL need not be the same for every router so represented and may change dynamically. Alternatively, the private routing protocol may generate a simulated HELLO message representing a router 120 in sub-network 105 in response to some event, such as receipt of a routing update through the private routing protocol.

A lower layer address contained in each received simulated HELLO message may be translated into a corresponding Internet Protocol (IP) address [act 1210]. This translation may be performed by a mechanism, such as, for example, Ethernet ARP. OSPF Router IDs may be determined [act 1215]. An OSPF Router ID, associated with each router 115/120 in sub-network 105, may be determined from OSPF link-state advertisement packets, database description packets, link-state request packets, or other OSPF protocol packets received from a respective router 115/120.

Inactive and other mobile leaf routers may be eliminated from the connectivity graph [act 1220]. Routers identified by a flag in their simulated HELLO messages as being not active may be eliminated from the connectivity graph. Additionally, other mobile leaf routers may be eliminated from the connectivity graph. These may be identified, for example, by their IP addresses. Routers may be eliminated from the connectivity graph by first considering a set of all the vertices adjacent to the vertex to be eliminated. The vertex to be eliminated and all edges leading to it may be deleted from the graph. Then, new edges may be inserted connecting all vertices to which the deleted vertex had previously been adjacent, and assigned costs equal to the sum of the costs along the two edges that it replaces. This process may be repeated until all such vertices have been eliminated.

Exemplary Mobile Leaf Router Affiliation Process

Figure 13:
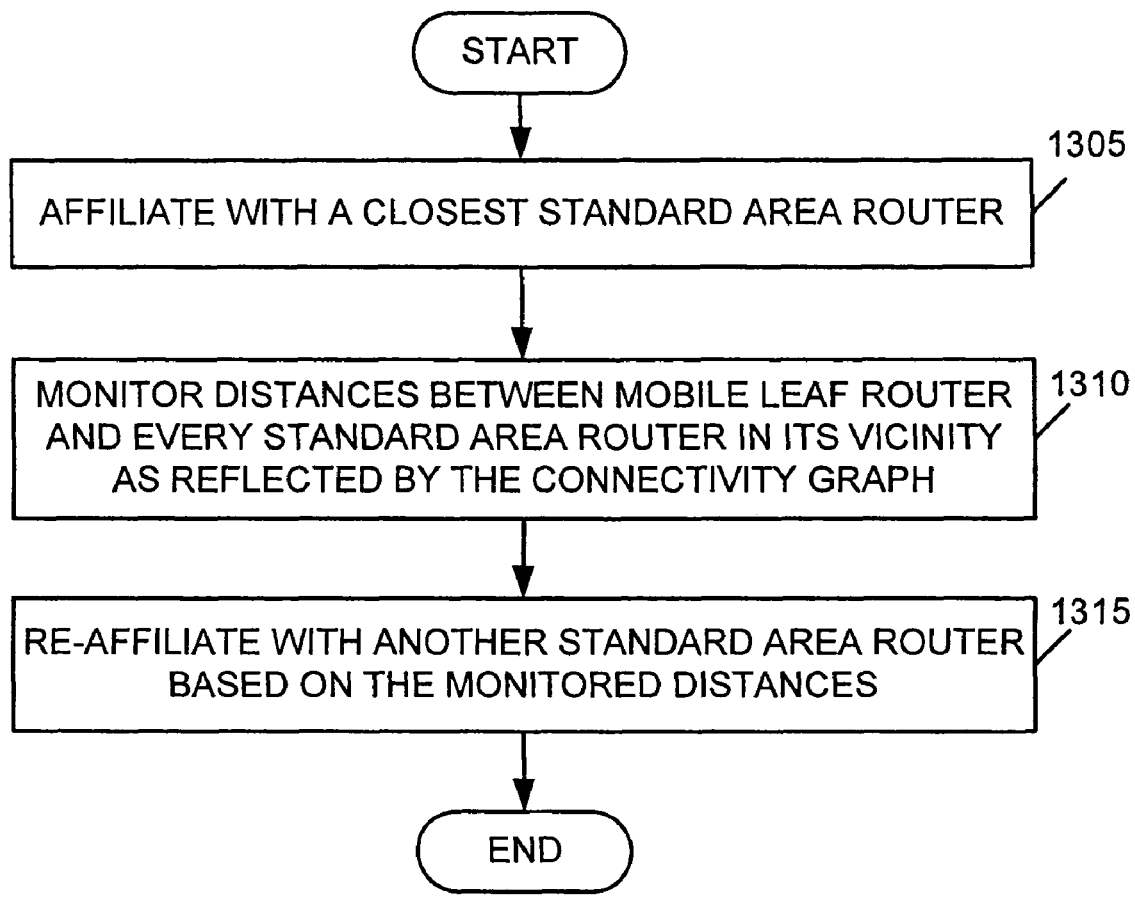
FIG. 13 is a flow chart that illustrates an exemplary process, consistent with the present invention, for a mobile leaf router to affiliate with a standard area router of sub-network 105 of FIG. 1A.

FIG. 13 is a flow chart that illustrates an exemplary process, consistent with the present invention, for a mobile leaf router 115 to affiliate with a standard area router 120 of network 100. The acts of the exemplary process of FIG. 13 provide further detail to act 1110 of FIG. 11.

The exemplary process may begin with mobile leaf router 115 affiliating with a closest standard area router 120 [act 1305]. Mobile leaf router 115 may determine the standard area router 120 with which to affiliate from information contained in the connectivity graph constructed from the simulated HELLO messages received from the private, internal routing protocol of sub-network 105. The distances determined from the connectivity graph may be modified, for example, by configured values so as to establish a preference for affiliation with certain routers. Mobile leaf router 115 may then continue to monitor distances between itself and every standard area router 120 in mobile leaf router's vicinity, as reflected by the connectivity graph, to determine whether or not it should reaffiliate with a different parent router [act 1310]. To avoid bouncing between one parent router and another, it should not reaffiliate just because some other potential parent router has become closer, but instead apply a hysteresis check. For example, let $c_i$ be router 115's cost to the $i^{th}$ neighboring router, and c be the cost to router 115's current affiliated router (both c and $c_i$ may change with time). The time-integral of the advantage ($C_{advantage}$) of affiliating with a different router may be computed by Eqn. (1) above. Mobile leaf router 115 may then re-affiliate with another standard area router based on the monitored distances [act 1315]. For example, if $C_{advantage}$ exceeds a configurable threshold value, then mobile leaf router 115 may re-affiliate with a corresponding router, which is now closest.

Exemplary Mobile Leaf Router Network Graph Construction Process

Figure 14:
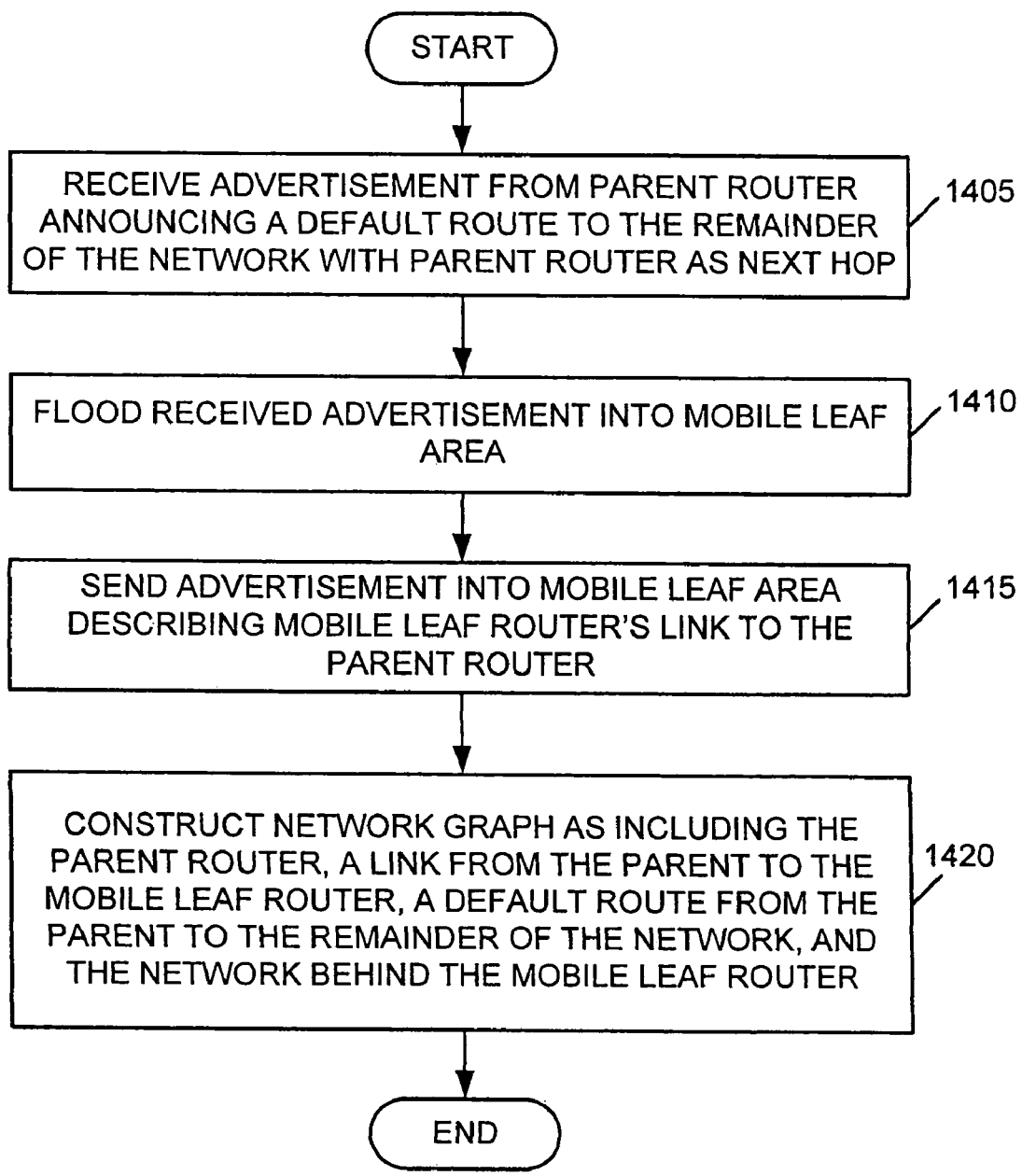
FIG. 14 is a flow chart that illustrates an exemplary process, consistent with the present invention, for a mobile leaf router to construct a virtual model network graph of sub-network 105 of FIG. 1A.

FIG. 14 is a flow chart that illustrates an exemplary process, consistent with the present invention, for a mobile leaf router 115 to construct a virtual model network graph of network 100. The acts of the exemplary process of FIG. 14 provide further detail to act 1115 of FIG. 11.

The exemplary process may begin with the receipt of an advertisement from a parent router announcing a default route to the remainder of sub-network 105 with the parent router as a next hop [act 1405]. Mobile leaf router 115 may flood the received advertisement into the mobile leaf area [act 1410]. Mobile leaf router 115 may also send an advertisement into the mobile leaf area describing the mobile leaf router's link to the parent router [act 1415]. Mobile leaf router 115 may then construct a virtual model network graph as including the parent router, a link from the parent to the mobile leaf router, a default route from the parent to the remainder of the network, and the network behind the mobile leaf router [act 1420]. The constructed virtual model network graph may be stored in memory at mobile leaf router 115. As an alternative, since the identity of the parent router is already known to mobile leaf router 115, mobile leaf router 115 may construct this virtual model itself without need for an explicit advertisement of a default route by the parent router.

In addition, the parent router may incorporate mobile leaf router 115 and the mobile leaf network(s) behind it into its own virtual model network graph. To do so, it represents mobile leaf router 115 and the mobile leaf networks(s) behind it by means of OSPF AS-external or Area Summary advertisements.

Exemplary Routing Process

Figure 15:
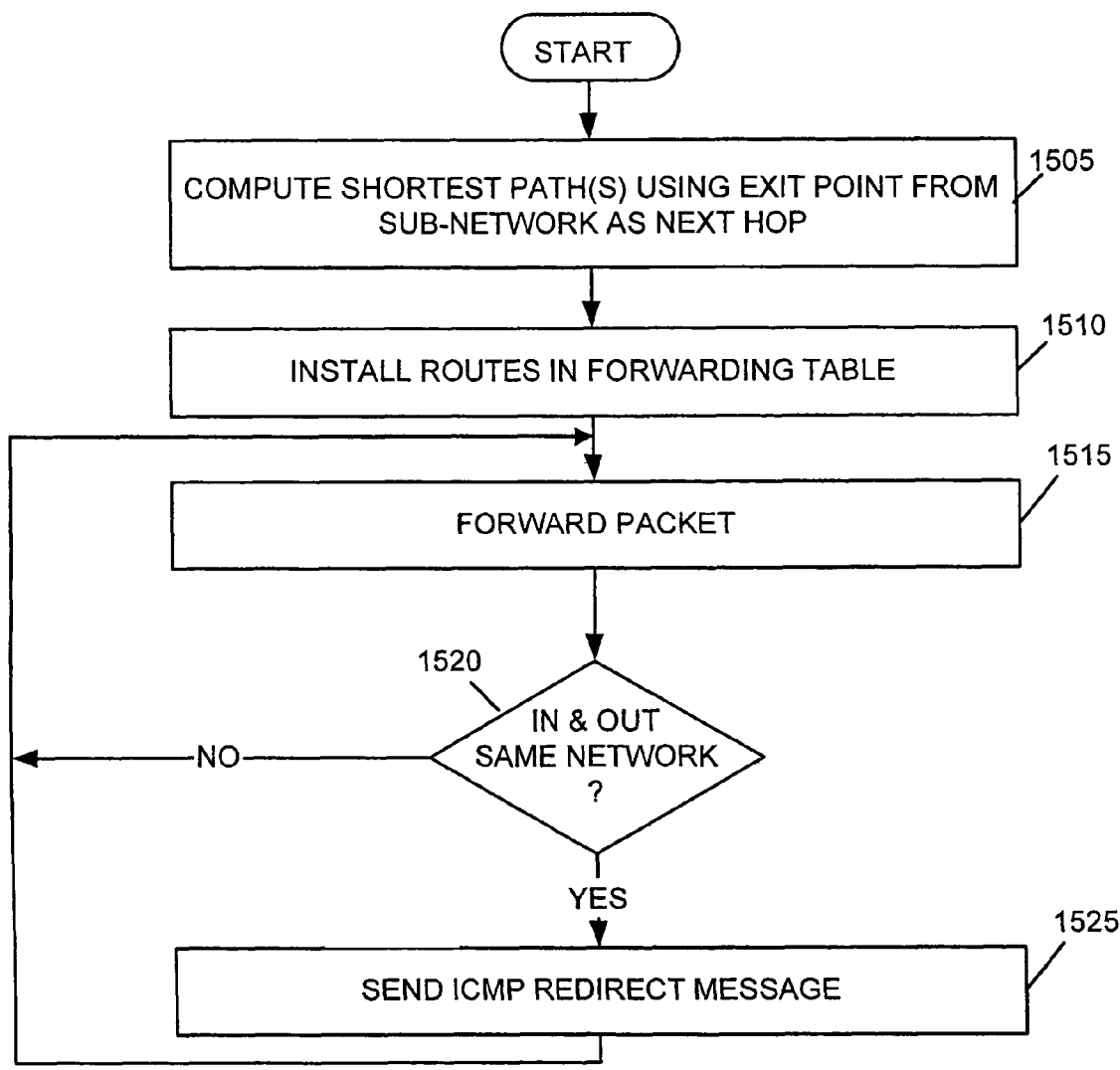
FIG. 15 is a flow chart that illustrates an exemplary process, consistent with the present invention, for routing of a data packet using a virtual model.

FIG. 15 is a flow chart that illustrates exemplary Internet Protocol (IP) routing of a data packet, in accordance with the OSPF virtual model of the present invention, by one or more routers 120 belonging to sub-network 105 having a private internal routing protocol. The routing process for a router not belonging to sub-network 105 may be the same as for standard OSPF.

The exemplary process may begin with router 120 computing the shortest path(s) to every known network and node of network 100 in accordance with existing OSPF mechanisms [act 1505]. This computation may be performed, for example, through use of the well-known Dijkstra algorithm, or by any other equivalent algorithm. However, when computing the shortest path(s) in act 1505, the rule employed for choosing the "next hop" may be modified, so that actual routing within sub-network 105 will be performed by its private routing protocol, and not by OSPF, in accordance with the advertised virtual model (e.g., network graph 300). As each shortest path is determined, the node at which that path first exits sub-network 105 may be determined and selected as the "next hop" in place of the node that would normally have been chosen for this purpose. The node at which the shortest path first exits sub-network 105 can be found, for example, by modifying the Dijkstra algorithm, or equivalent, to retain full path information, and then searching down that path until the first node not belonging to sub-network 105 is found. The node immediately preceeding that node may be the desired exit point. In an alternative implementation, the node at which the shortest path first exits sub-network 105 can be determined by modifying the Dijkstra algorithm, or its equivalent, to compute this information directly.

The OSPF routing algorithm implemented at router 120 may install the computed shortest path(s) into an IP forwarding table [act 1510]. A packet may then be routed to its destination in accordance with the information contained in the IP forwarding table [act 1515]. If the IP "next hop" for this packet is a router on sub-network 105, then forwarding the packet may require a second lookup in a second forwarding table maintained by the private routing protocol internal to sub-network 105 to determine the true "next hop." In this second lookup, the IP "next hop" (after conversion into the appropriate address format for the private routing protocol internal to sub-network 105) becomes the destination address for the private forwarding process internal to sub-network 105. If sub-network 105 is split across multiple OSPF areas, including mobile leaf areas, then the shortest path(s) computation (described with respect to act 1505 above) for finding the exit point from sub-network 105 may terminate before the true exit point from sub-network 105 is found, due to lack of full routing information beyond that point. In that case, a packet to be forwarded would exit the private forwarding system internal to sub-network 105 at this intermediate point, have a new IP "next hop" determined from the IP forwarding table at this intermediate point, and then re-enter the private forwarding system internal to sub-network 105 for delivery to the true exit point. Although a packet would still be correctly routed to its destination, this could result in undesirably heavy traffic loads at such intermediate points, such as area border routers (including the parent routers of mobile leaf routers). This case, however, can be detected at the area border router [act 1520] because it will forward back onto sub-network 105 a packet just received from the same network. The area border router may then send an Internet Control Message Protocol (ICMP) redirect, or equivalent, message [act 1525] to the router at which the packet entered network 105, instructing it as to the proper exit point to which future packets with the same destination should be forwarded. A router receiving such a message may incorporate it into its routing computation (see act 1505 above) to permit it to determine the true exit point from sub-network 105 for future packets with the same destination.

Conclusion

Systems and methods consistent with the present invention modify OSPF to permit seamless integration of a multi-hop, multi-access packet radio network that includes its own private, internal routing protocol, into an overall OSPF routing environment. These modifications maintain strict compatibility with standard OSPF on all routers outside the multi-hop, multi-access radio network, while optimizing the representation of the packet radio network so as to minimize overhead from the OSPF routing protocol and facilitate scaling to networks containing large numbers of OSPF routers. In this modified version of OSPF, routers within the multi-hop, multi-access packet radio network generate a virtual OSPF network model in which a multi-hop, multi-access radio network may be represented as a set of multi-access links, with each being identified by its own designated router. In the virtual model, standard area routers may affiliate with the designated router to which they are closest in the absence of mobility. Adjacent multi-access links may be connected by connecting routers that belong to both links and/or by point-to-point links between routers in each multi-access link.

The virtual model, consistent with the principles of the invention, may be advertised to OSPF routers outside the packet radio network using the standard OSPF protocol, and may be disseminated within the packet radio network by either the standard or a modified version of the OSPF protocol. Routers outside the multi-hop, multi-access packet radio network route packets in accordance with the standard OSPF procedures, and are not even aware that they are employing a model of the network that is virtual rather than actual. Within the packet radio network, the routing procedure may be modified so that the packet radio network's private, internal routing protocol, rather than OSPF, is used for routing within the packet radio network itself.

The foregoing description of preferred embodiments of the present invention provides illustration and description, but is not intended to be exhaustive or to limit the invention to the precise form disclosed. Modifications and variations are possible in light of the above teachings or may be acquired from practice of the invention. For example, while this invention is described herein in terms of its applicability to a packet radio network, it will be appreciated, that the actual physical means of communication employed by that network may vary. It may include wired, radio, sonar, optical, microwave, and other physical means of communication. An element for determining the applicability of this invention is the existence (or createability) of a private, internal routing protocol for that network, whose actual connectivity can be modeled by a virtual model as described herein. Likewise, while the invention is described in terms of integrating a packet radio network with its own internal routing system into an overall OSPF routing environment and in terms of constructing a virtual model for use by OSPF, the actual routing protocol into which the packet radio network is to be integrated may vary. It may include variants and future derivatives of OSPF, other link-state routing protocols, hybrids, and variants thereof, which may form components of the IPv4 protocol suite, the IPv6 protocol suite, the OSI protocol suite, other networking suites, or may stand independently. The element determining the applicability of this invention to a particular protocol is the ability of that protocol to represent the packet radio network by a virtual model as described herein.

While series of acts have been described with regard to FIGS. 7-15, the order of the acts may be modified in other implementations consistent with the principles of the invention. Also, non-dependent acts may be performed in parallel.

No element, act, or instruction used in the description of the present application should be construed as critical or essential to the invention unless explicitly described as such. Also, as used herein, the article "a" is intended to include one or more items. Where only one item is intended, the term "one" or similar language is used.

As one skilled in the art will appreciate, the exemplary processes of FIGS. 7-15 can be implemented in logic, such as, for example, combinational logic, within each router 120 of network 100. Furthermore, the exemplary processes of FIGS. 7-15 can be implemented in software and stored on a computer-readable memory, such as Random Access Memory (RAM) or Read Only Memory (ROM), associated with each router 120 of network 100. Additionally, the exemplary processes of FIGS. 7-15 may be implemented in any combination of software or hardware.

The scope of the invention is defined by the following claims and their equivalents.

What is claimed is:

1. A method preformed by a network device comprising:
   acquiring information as to the internal topology of a sub-network that uses a private, internal routing system;
   constructing a virtual model of the sub-network in terms of constructs comprehensible to a public, global routing system of a network, where the virtual model contains a link-state description of an idealized sub-network that represents an actual sub-network, where the idealized sub-network includes:
   nodes of the sub-network that are also nodes of the network,
   links among the nodes, where a connected path exists through the idealized sub-network between two nodes of the idealized sub-network if there exists a connected path between the two nodes through the actual sub-network, where a degree of the idealized sub-network is less than a degree of the actual sub-network, and where a set of links in the idealized sub-network changes less frequently than a set of links in the actual sub-network;
   costs associated with the links, where a cost of a shortest connected path between two nodes of the idealized sub-network approximates a cost of a shortest connected path between the two nodes of the actual sub-network, and where costs associated with the links in the idealized sub-network change less frequently than costs associated with the actual sub-network,
   employing the virtual model and public, global routing system together with the private, internal routing system of the sub-network for routing within the sub-network, where the virtual model and public, global routing system are used to select among two or more potential exit points from the sub-network for traffic that will exit or transit the sub-network, and where the private, internal routing system is used to select the internal route to the exit point;
   distributing the virtual model to routers in the network for routing within the network, where the routers use the virtual model to select a preferred entry point to the sub-network from among two or more potential entry points for traffic that will enter or transit the sub-network.

2. The method of claim 1, where the network is at least one of an IPv4 network, an IPv6 network, or a derivative of an IPv4 or IPv6 network.

3. The method of claim 1, where the public, global routing system implements Open Shortest Path First (OSPF) or a derivative of OSPF.

4. The method of claim 1, where the private, internal routing system of the sub-network operates at a lower layer in a network protocol stack than the public, global routing system.

5. The method of claim 1, where the sub-network is a mobile ad-hoc network (MANET) that employs at least one of radio, sonar, optical, or other physical communications mechanisms.

6. The method of claim 1, where the private, internal routing system implements Open Shortest Path First (OSPF) or a derivative of OSPF.

7. The method of claim 1, where the private, internal routing system is a custom routing protocol intended to optimize routing within the sub-network.

8. The method of claim 1, where a topology of the sub-network may vary with time due to mobility of hosts and routers of the plurality of routers, due to changes in connectivity between the hosts and the routers of the plurality of routers, due to the entry or exit of routers of the plurality of routers from the sub-network, or due to other factors.

9. The method of claim 1, where the virtual model of the sub-network differs from an actual connectivity of the sub-network.

10. The method of claim 1, where the virtual model of the sub-network includes a plurality of multi-access links, point-to-point links, AS-external routes, and area-external summary routes.

11. The method of claim 1, where information as to the actual topology of the sub-network is acquired by messages generated by the private, internal routing system of the sub-network.

12. The method of claim 1, where the virtual model of the sub-network is constructed dynamically from information as to an actual connectivity of the sub-network.

13. The method of claim 1, where an actual route of a packet through the same network differs from a route as computed by a public, global routing protocol, with entrance and exit points to the sub-network being determined by the public, global routing protocol.

14. The method of claim 1, where the virtual model of the sub-network is employed by routers of a plurality of routers in the sub-network to determine a desired exit point from the sub-network, and the-private internal routing system of the sub-network is employed to determine a route through the sub-network to the determined exit point.

15. The method of claim 1, where the virtual model is distributed by routers of a plurality of routers in the sub-network to other routers in the network using mechanisms provided by the public, global routing system so as to maintain strict compatibility with off-the-shelf routers in the network implementing the public, global routing system.

16. A method of reducing routing overhead on a network containing a sub-network including a plurality of routers, comprising:
    employing a public routing protocol on the network;
    employing a separate, private routing protocol internal to the sub-network;
    acquiring information as to an internal topology of the sub-network;
    constructing a virtual model of the sub-network in terms of constructs comprehensible to the public, global routing protocol, where the virtual model contains a link-state description of an idealized sub-network that represents an actual sub-network, where the idealized sub-network includes:
    nodes of the sub-network that are also nodes of the network, links among the nodes, where a connected path exists through the idealized sub-network between two nodes of the idealized sub-network if there exists a connected path between the two nodes through the actual sub-network, where a degree of the idealized sub-network is less than a degree of the actual sub-network, and where a set of links in the idealized sub-network changes less frequently than a set of links in the actual sub-network;

costs associated with the links, where a cost of a shortest connected path between two nodes of the idealized sub-network approximates a cost of a shortest connected path between the two nodes of the actual sub-network, and where costs associated with the links in the idealized sub-network change less frequently than costs associated with the actual sub-network, employing the virtual model and the public, global routing system together with the sub-network's private, internal routing protocol for routing within the sub-network, where the virtual model and public, global routing system are used to select among two or more potential exit points from the sub-network for traffic that will exit or transit the sub-network, and the private, internal routing system is used to select the internal route to the exit point;

distributing the virtual model to other routers in the network for routing in that network, where routers use the virtual model to select a preferred entry point to the sub-network from among two or more potential entry points for traffic that will enter or transit the sub-network.

17. The method of claim 16, where the network is at least one of an IPv4 network, an IPv6 network, or a derivative of an IPv4 or an IPv6 network.

18. The method of claim 16, where the public routing protocol comprises an Open Shortest Path First (OSPF) routing protocol or a derivative of an OSPF routing protocol.

19. The method of claim 16, where the private, internal routing protocol of the sub-network operates at a lower layer in a network protocol stack than the public, global routing protocol.

20. The method of claim 16, where the sub-network is a mobile ad-hoc network (MANET) that employs at least one of radio, sonar, optical, or other physical communications mechanism.

21. The method of claim 16, where the private, internal routing protocol implements Open Shortest Path First (OSPF) or a derivative of OSPF.

22. The method of claim 16, where the private, internal routing protocol is a custom routing protocol intended to optimize routing within the sub-network.

23. The method of claim 16, where a topology of the sub-network varies with time due to mobility of hosts and routers of the plurality of routers, due to changes in connectivity between the hosts and the routers of the plurality of routers, due to the entry or exit of routers of the plurality of routers from the sub-network, or due to other factors.

24. The method of claim 16, where the virtual model of the sub-network differs from an actual connectivity of the sub-network.

25. The method of claim 16, where the virtual model of the sub-network includes a plurality of multi-access links, point-to-point links, AS-external routes, and area-external summary routes.

26. The method of claim 16, where information as to an actual topology of the sub-network is acquired by messages generated by the private, internal routing protocol of the sub-network.

27. The method of claim 16, where the virtual model of the sub-network is constructed dynamically from information as to an actual connectivity of the sub-network.

28. The method of claim 16, where an actual route of a packet through the network differs from a route as computed by the public, global routing protocol, with entrance and exit points to the sub-network being determined by the public, global routing protocol.

29. The method of claim 16, where the virtual model of the sub-network is employed by routers of the plurality of routers to determine a desired exit point from the sub-network, and the sub-network's private internal routing protocol is employed to determine a route through the sub-network to the determined exit point.

30. The method of claim 16, where the virtual model is distributed by routers of the plurality of routers to other routers in the network using mechanisms provided by the public, global routing protocol, so as to maintain strict compatibility with off-the-shelf routers in the network implementing the public, global routing protocol.

31. A method performed by a network device, the method comprising:
    determining, by the network device, a network graph identifying actual connectivity among a plurality of routers in a sub-network;
    representing, by the network device, the sub-network as a set of links; and
    constructing, by the network device, a virtual model of the sub-network from the actual connectivity of the network graph, where connectivity of the virtual model is different than the actual connectivity of the network graph, where the virtual model is represented using constructs of a routing protocol that is different from a private, routing protocol employed on the sub-network, and where the virtual model incorporates a plurality of network nodes representing multi-access links so as to minimize an average network degree of the virtual model and minimize overhead involved in distributing the virtual model.

32. A method performed by a network device, the method comprising:
    determining, by the network device, a network graph identifying actual connectivity among a plurality of routers in a sub-network;
    representing, by the network device, the sub-network as a set of links; and constructing, by the network device, a virtual model of the sub-network from the actual connectivity of the network graph, where connectivity of the virtual model is different than the actual connectivity of the network graph, where the virtual model is represented using constructs of a routing protocol that is different from a private, routing protocol employed on the sub-network, and where the virtual model hides most changes to the internal topology of the sub-network so as to minimize a frequency with which the virtual model is redistributed and minimize the overhead involved in distributing the virtual model.

33. A method performed by a network device, the method comprising:
    determining, by the network device, a network graph identifying actual connectivity among a plurality of routers in a sub-network;

representing, by the network device, the sub-network as a set of links; and constructing, by the network device, a virtual model of the sub-network from the actual connectivity of the network graph, where connectivity of the virtual model is different than the actual connectivity of the network graph, where the virtual model is represented using constructs of a routing protocol that is different from a private, routing protocol employed on the sub-network; and incorporating a hysteresis check to limit a rate at which the virtual model of the sub-network may change in time in response to changes in a topology of the sub-network so as to minimize a frequency with which the virtual model is redistributed and minimize the overhead involved in distributing the virtual model.

34. A method, performed by a network device, the method comprising:

determining, by the network device, a desired exit point from a sub-network that uses a private, internal routing protocol based upon a different public, global routing protocol of a network, where the public, global routing protocol routes in accordance with a virtual model of the sub-network, where the virtual model contains a link-state description of an idealized sub-network that represents an actual sub-network, where the idealized sub-network includes:

nodes of the sub-network that are also nodes of the network, links among the nodes, where a connected path exists through the idealized sub-network between two nodes of the idealized sub-network if there exists a connected path between the two nodes through the actual sub-network, where a degree of the idealized sub-network is less than a degree of the actual sub-network, and where a set of links in the idealized sub-network changes less frequently than a set of links in the actual sub-network, and costs associated with the links, where a cost of a shortest connected path between two nodes of the idealized sub-network approximates a cost of a shortest connected path between the two nodes of the actual sub-network, and where costs associated with the links in the idealized sub-network change less frequently than costs associated with the actual sub-network; and determining, by the network device, a next-hop destination to reach the desired exit point based upon the private, internal routing system.

35. The method of claim 34, where the public, global routing protocol is Open Shortest Path First (OSPF) or a derivative of OSPF.

36. A method, performed by a network device, the method comprising:

determining, by the network device, a desired exit point from a sub-network that uses a private, internal routing protocol based upon a different public, global routing protocol of a network, where the public, global routing protocol routes in accordance with a virtual model of the sub-network, where the determined desired exit point chosen is a same as that selected by the public, global routing protocol as a next-hop destination by applying its standard routing computation to the virtual model of the sub-network, where the virtual model contains a link-state description of an idealized sub-network that represents an actual sub-network, where the idealized sub-network includes:

nodes of the sub-network that are also nodes of the network, links among the nodes, where a connected path exists through the idealized sub-network between two nodes of the idealized sub-network if there exists a connected path between the two nodes through the actual sub-network, where a degree of the idealized sub-network is less than a degree of the actual sub-network, and where a set of links in the idealized sub-network changes less frequently than a set of links in the actual sub-network, and costs associated with the links, where a cost of a shortest connected path between two nodes of the idealized sub-network approximates a cost of a shortest connected path between the two nodes of the actual sub-network, and where costs associated with the links in the idealized sub-network change less frequently than costs associated with the actual sub-network; and determining, by the network device, a next-hop destination to reach the desired exit point based upon the private, internal routing system.

37. A method, performed by a network device, the method comprising:

determining, by the network device, a desired exit point from a sub-network that uses a private, internal routing protocol based upon a different public, global routing protocol of a network, where the desired exit point is determined by searching along a route selected by the public, global routing protocol to find an actual point at which the route exits the sub-network as known to the public, global routing protocol, and where the search terminates before reaching the actual desired exit point from the network due to incomplete routing information, leading to a choice of an intermediate router as the exit point; and determining, by the network device, a next-hop destination to reach the desired exit point based upon the private, internal routing protocol.

* * * * *